(12) United States Patent
Saito et al.

(10) Patent No.: US 10,705,472 B2
(45) Date of Patent: Jul. 7, 2020

(54) IMAGE FORMING APPARATUS HAVING SIMPLEX AND DUPLEX PRINTING

(71) Applicant: CANON KABUSHIKI KAISHA, Tokyo (JP)

(72) Inventors: Sho Saito, Toda (JP); Masahiro Mutsuno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/291,211

(22) Filed: Mar. 4, 2019

(65) Prior Publication Data
US 2019/0286044 A1 Sep. 19, 2019

(30) Foreign Application Priority Data

Mar. 15, 2018 (JP) .................................. 2018-047732
Mar. 15, 2018 (JP) .................................. 2018-047733
Dec. 13, 2018 (JP) .................................. 2018-233608

(51) Int. Cl.
*G03G 15/00* (2006.01)
*B41J 13/00* (2006.01)
(Continued)

(52) U.S. Cl.
CPC ............ *G03G 15/6558* (2013.01); *B41J 3/60* (2013.01); *B41J 13/0045* (2013.01); *B65H 5/26* (2013.01); *B65H 29/58* (2013.01); *G03G 15/234* (2013.01); *G03G 15/5016* (2013.01); *G03G 15/5083* (2013.01); *G03G 15/6552* (2013.01); *G03G 15/6579* (2013.01); *G03G 2215/00409* (2013.01); *G03G 2215/00586* (2013.01)

(58) Field of Classification Search
CPC ............ G03G 15/6558; G03G 15/234; G03G 15/5083; G03G 15/6552; G03G 15/5016; G03G 15/6579; G03G 2215/00409; G03G 2215/00586; G03G 15/23; G03G 15/231; G03G 2215/00578; G03G 2215/00556; G03G 15/2029; G03G 2215/00447; G03G 2215/00476; G03G 2215/00751; G03G 2215/00759; B41J 13/0045; B41J 3/60; B65H 29/58; B65H 5/26
See application file for complete search history.

(56) References Cited

U.S. PATENT DOCUMENTS 6,813,455 B2 11/2004 Asai
9,395,942 B2 7/2016 Mutsuno
(Continued)

FOREIGN PATENT DOCUMENTS

JP 2003-050482 A 2/2003

*Primary Examiner* — David M. Gray
*Assistant Examiner* — Laura Roth
(74) *Attorney, Agent, or Firm* — Venable LLP

(57) ABSTRACT

An image forming apparatus includes a controller that receives a print job, which includes the sheet type and print settings of simplex printing or duplex printing. A sheet stacked on a feeding unit is discharged to a discharge portion with an upper surface of the sheet facing different directions in duplex printing and in simplex printing in a first mode, and the sheet stacked on the feeding unit is discharged to the discharge portion with the upper surface of the sheet facing the same direction in the duplex printing and in the simplex printing in a second mode.

9 Claims, 16 Drawing Sheets

(51) Int. Cl.
*B65H 29/58* (2006.01)
*B65H 5/26* (2006.01)
*B41J 3/60* (2006.01)
*G03G 15/23* (2006.01)

(56) References Cited

U.S. PATENT DOCUMENTS

| | | |
|---|---|---|
| 9,821,583 B2 | 11/2017 | Mutsuno |
| 2008/0292329 A1* | 11/2008 | Kimoto .............. G03G 15/6508 399/17 |
| 2017/0031293 A1* | 2/2017 | Shibata .............. G03G 15/6529 |
| 2019/0286043 A1* | 9/2019 | Oka ................... G03G 15/1605 |

* cited by examiner

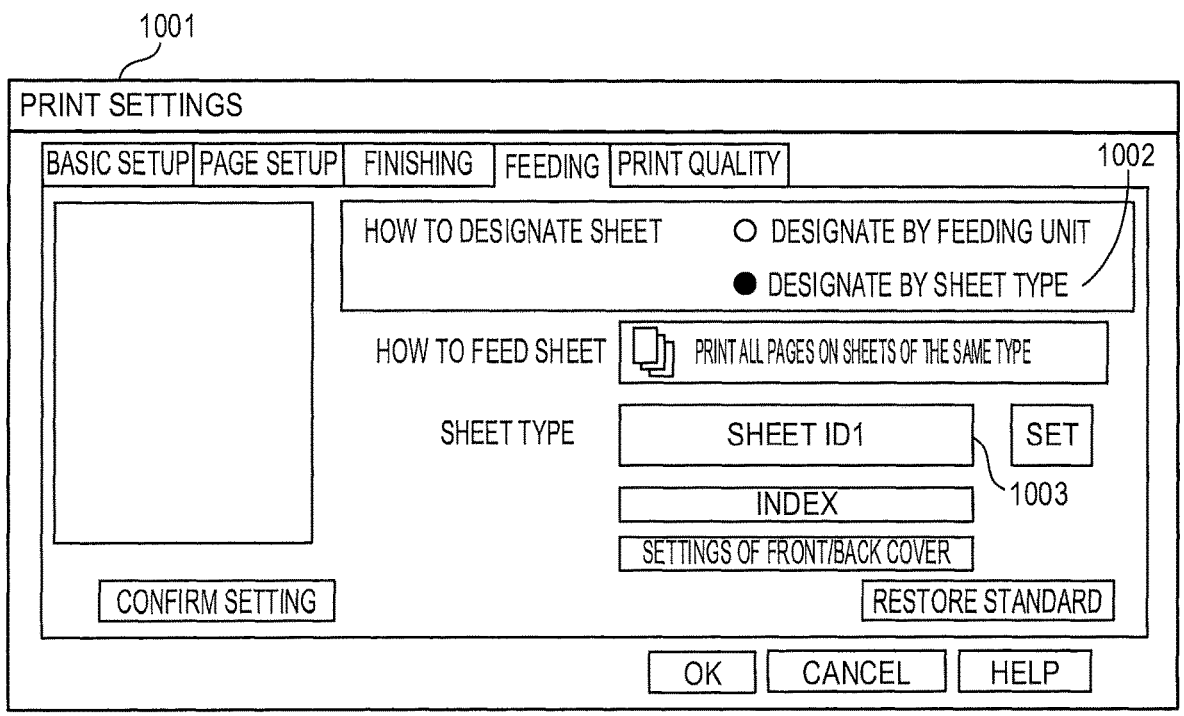

IMAGE FORMING APPARATUS HAVING SIMPLEX AND DUPLEX PRINTING

BACKGROUND OF THE INVENTION

Field of the Invention

The present invention relates to an image forming apparatus capable of simplex printing and duplex printing.

Description of the Related Art

Some image forming apparatus have a configuration in which printing on a sheet is carried out while the sheet is conveyed in a vertical direction (an image forming apparatus of this type is hereinafter referred to as "vertical path machine"), and some other image forming apparatus have a configuration in which printing on a sheet is carried out while the sheet is conveyed in a horizontal direction (an image forming apparatus of this type is hereinafter referred to as "horizontal path machine"). In simplex printing of a vertical path machine, for example, an image of a front side (the first page) is printed on an upper surface (a first side) of a sheet set in a feeding cassette, and the sheet is discharged with the upper surface (of the set sheet), on which the image of the front side has been printed, facing downward. In duplex printing of the vertical path machine, on the other hand, an image of a back side (the second page) is printed on an upper surface of a sheet set in the feeding cassette. The sheet is then reversed on a double-sided conveying path, and an image of a front side (the first page) is printed on a lower surface (a second side) of the sheet. The sheet is discharged with the lower surface (of the set sheet), on which the image of the front side has been printed, facing downward. In short, simplex printing and duplex printing in a vertical path machine differ from each other in which of the upper surface and lower surface of a sheet set in the feeding cassette is a surface on which an image of the front side is to be printed. Accordingly, when an image is to be printed in a vertical path machine on a sheet whose front side and back side are different from each other, for example, a preprinted sheet or a punched sheet, which of the front side and back side of the sheet set in the feeding cassette faces upward varies depending on whether simplex printing or duplex printing is to be performed.

There is known a method in which, in simplex printing, a sheet is passed along a double-sided conveying path without having an image of the front side printed on the upper surface of the sheet, depending on the attributes of a feeding unit, and is reversed so that the image of the front side is printed on the lower surface of the sheet. There is also a technology in which, in duplex printing, a sheet is passed along a double-sided conveying path without having an image of the front side printed on the lower surface of the sheet, depending on the type of the sheet, and is reversed so that the image of the front side and an image of the back side are printed on the upper surface of the sheet and the lower surface of the sheet, respectively (Japanese Patent Application Laid-Open No. 2003-50482). The method and the technology eliminate the requirement to vary a direction in which the upper surface and lower surface of a sheet are set between simplex printing and duplex printing in a vertical path machine as well.

However, the method described above in which a sheet is passed along the double-sided conveying path in simplex printing, depending on the attributes of the feeding unit, takes a long time in printing because even a sheet whose upper surface and lower surface are equal to each other is passed along the double-sided conveying path in simplex printing. Printing takes a long time also in Japanese Patent Application Laid-Open No. 2003-50482, in which a sheet is reversed prior to duplex printing.

SUMMARY OF THE INVENTION

It is therefore an object of the present invention to provide an image forming apparatus in which simplex printing is performed in one of a first mode and a second mode depending on attribute information, which is associated with a sheet type.

An image forming apparatus according to one embodiment of the present invention, comprises:

a feeding unit on which a sheet is to be stacked;

a conveying path on which the sheet fed from the feeding unit is to be conveyed;

an image forming portion configured to form an image on the sheet conveyed on the conveying path;

a reverse portion configured to reverse the sheet passed through the image forming portion;

a re-conveying path on which the sheet reversed by the reverse portion is to be conveyed;

a discharge portion to which the sheet on which the image has been formed is to be discharged;

a storage portion configured to store attribute information associated with a sheet type; and a controller configured to receive a print job, which includes the sheet type and print settings of simplex printing or duplex printing, wherein, when the duplex printing is set in the print settings, the controller controls the image forming portion to form an image on a first side of the sheet conveyed from the feeding unit to the conveying path, controls the reverse portion to reverse the sheet on which the image has been formed, controls the image forming portion to form an image on a second side opposite to the first side of the sheet conveyed to the conveying path through the re-conveying path, and then discharges the sheet to the discharge portion, wherein, when the simplex printing is set in the print settings, the controller determines whether a mode set in the attribute information associated with the sheet type that is included in the print job is a first mode or a second mode, wherein, when the mode is the first mode, the controller controls the image forming portion to form an image on the first side of the sheet conveyed from the feeding unit to the conveying path, and discharges the sheet on which the image has been formed to the discharge portion without passing the sheet through the re-conveying path, and wherein, when the mode is the second mode, the controller controls the image forming portion to avoid forming an image on the first side of the sheet conveyed from the feeding unit to the conveying path, controls the reverse portion to reverse the sheet, controls the image forming portion to form an image on the second side opposite to the first side of the sheet conveyed to the conveying path through the re-conveying path, and discharges the sheet to the discharge portion.

Further features of the present invention will become apparent from the following description of exemplary embodiments with reference to the attached drawings.

BRIEF DESCRIPTION OF THE DRAWINGS

FIG. 9 is a diagram for illustrating a print driver screen when printing is instructed from a PC.

FIG. 10 is a diagram for illustrating a data structure of a print job.

DESCRIPTION OF THE EMBODIMENTS

Embodiments will be described below with reference to the drawings.

First Embodiment (Image Forming Apparatus)

Figure 1A:
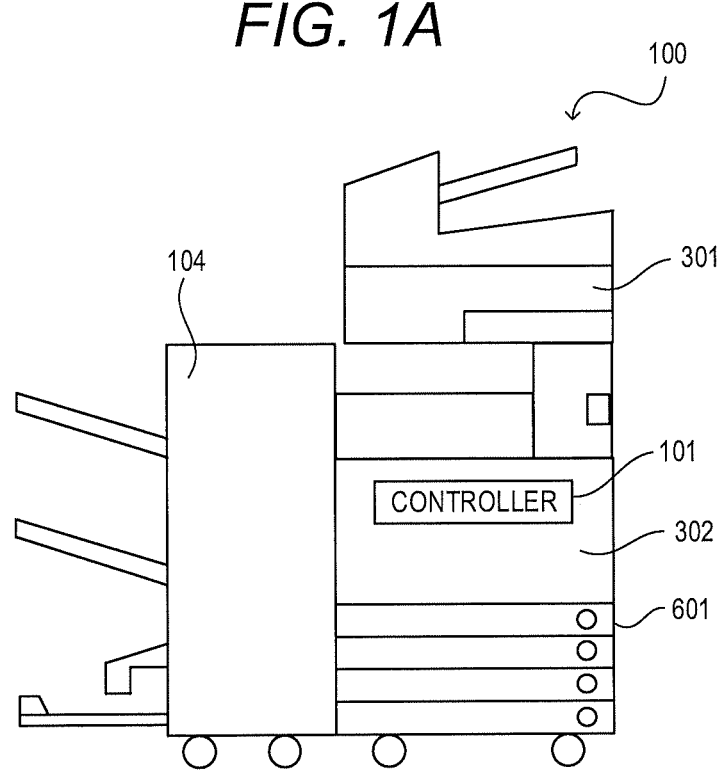
FIG. 1A and FIG. 1B are diagrams for illustrating an MFP.
Figure 1B:
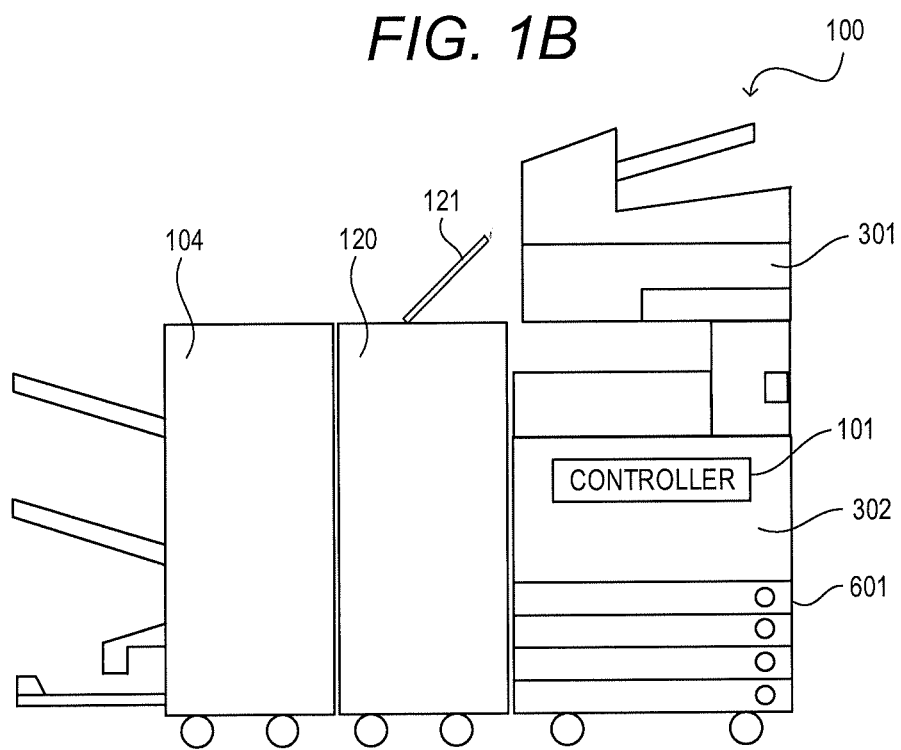

A multi-function peripheral (hereinafter abbreviated as MFP) 100 will be described with reference to FIG. 1A and FIG. 1B as an example of an image forming apparatus with which an image is formed on a recording medium (hereinafter referred to as "sheet"). FIG. 1A and FIG. 1B are diagrams for illustrating the MFP 100. The MFP 100 includes a scanner unit (reading unit) 301 configured to read an image of a document, a printer unit (image forming portion) 302 configured to form an image on a sheet, and a finisher (post-processing unit) 104 configured to perform book binding processing on a sheet on which an image has been formed. The MFP 100 may include, as illustrated in FIG. 1B, an inserter 120 between the printer unit 302 and the finisher 104. The scanner unit 301 serving as an image input device illuminates a document put on platen glass (not shown), and scans light reflected from the document with a CCD line sensor to convert an image of the document into image data. The color and size of the document are determined based on the image data generated by the conversion. The printer unit 302 serving as an image output device prints an image on a sheet based on image data. The printer unit 302 in the first embodiment uses electrophotography to form an image on a sheet. However, the printer unit 302 is not limited to electrophotography, and may use various types of printing methods including ink jet printing, electrostatic printing, and heat transfer printing to form an image on a sheet. A feeding cassette 601 is provided below the printer unit 302. Sheets are stacked in the feeding cassette 601. The stacked sheets are, for example, plain paper, recycled paper, thick paper, tracing paper, OHP sheets, colored paper, pre-punched paper, preprinted paper, letter-headed paper, or label paper. The finisher 104 performs stapling, folding, and other types of book binding processing on a sheet on which an image has been formed. The activation and termination of the printing operation is controlled by a CPU 201 (FIG. 2) of a controller 101 provided in a main body of the MFP 100.

(Control System)

Figure 2:
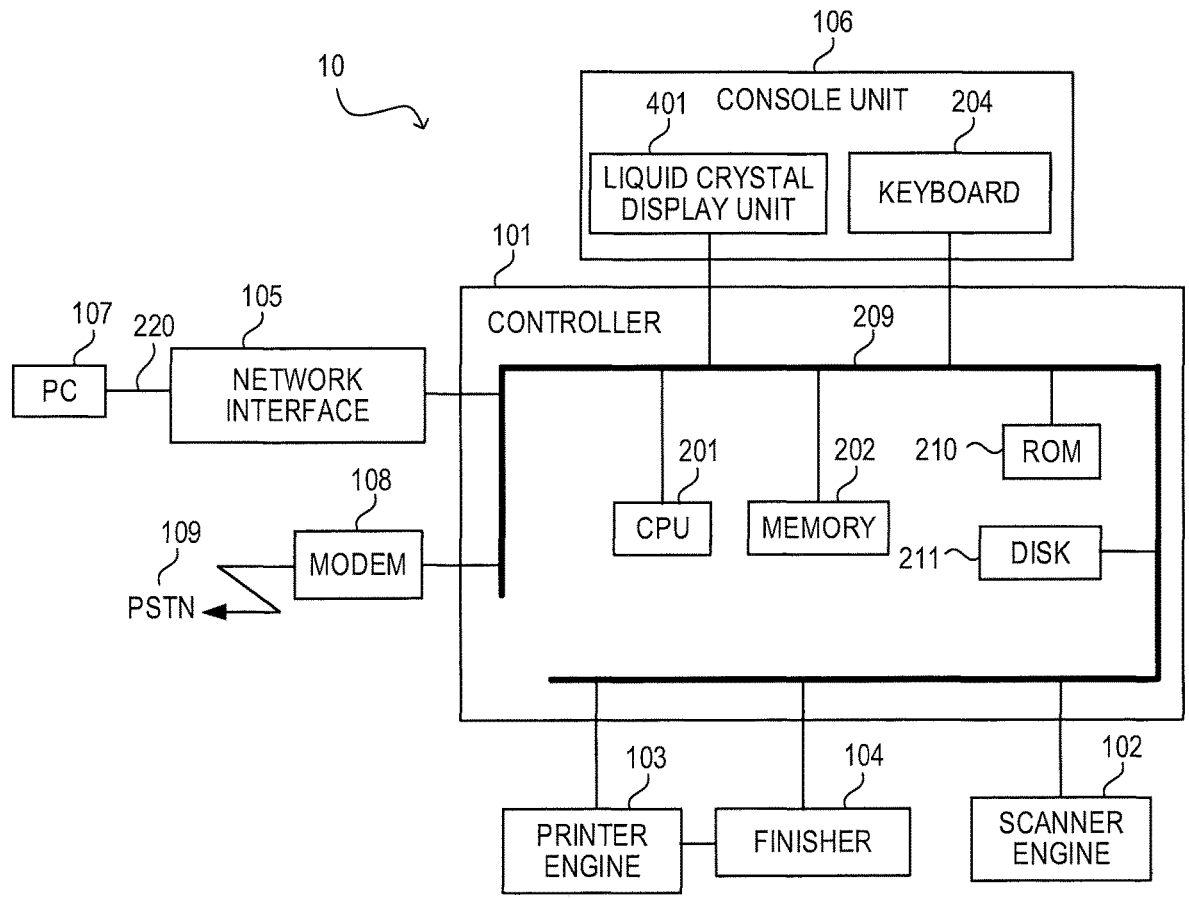
FIG. 2 is a block diagram of a control system of the MFP.

FIG. 2 is a block diagram of a control system 10 of the MFP 100. The control system 10 includes the controller 101 configured to perform overall control of the MFP 100. The controller 101 is electrically connected to a scanner engine 102 configured to control the scanner unit 301 and a printer engine 103 configured to control the printer unit 302. The controller 101 is also electrically connected to the finisher 104, a network interface 105, a console unit 106, and a modem 108. The scanner engine 102 and the printer engine 103 are controlled by the controller 101. The printer engine 103 is electrically connected to the finisher 104. The finisher 104 is capable of performing stapling processing, at once, on a plurality of sheets output from the printer unit 302. The finisher 104 is controlled by one of the controller 101 and the printer engine 103.

The network interface 105 provides two-way communication between an external device and the controller 101. The network interface 105 is connected, via a local area network (hereinafter abbreviated as LAN) 220, to a personal computer (hereinafter abbreviated as PC) 107 serving as an external device. The controller 101 is capable of two-way communication connection to the PC 107 via the network interface 105. The modem 108 connects to a public switched telephone network (PSTN) 109. The controller 101 inputs/outputs a facsimile image via the modem 108. The console unit 106 is formed of a liquid crystal display unit 401 and a keyboard 204. The console unit 106 displays information from the controller 101, and transmits an instruction from a user to the controller 101 as well. Functions executable on the console unit 106 are also executable on the PC 107 connected to the network interface 105.

The controller 101 includes the CPU (a controller) 201, a memory (storage portion) 202, a ROM 210, and a disk (storage portion) 211, which is a hard disk or the like. The CPU 201 is connected to the memory 202, the console unit 106, the ROM 210, and the disk 211 via a bus 209. Various programs and data are stored on one of the disk 211 and the ROM 210. The CPU 201 reads a program and data out of one of the disk 211 and the ROM 210 onto the memory 202 as required, and executes the program. The disk 211 may be removably attached to the MFP 100 or may be built in the MFP 100. A program may be downloaded from another MFP via one of the LAN 220 and the public switched telephone network 109 to be stored on the disk 211.

The memory 202 may be a volatile memory or a non-volatile memory, or may have both the functions of a volatile memory and a non-volatile memory. Alternatively, the MFP 100 may be configured so that the memory 202 has the function of a volatile memory while the disk 211 has the function of a non-volatile memory. The memory 202 and/or the disk 211 may be a memory medium removable from the MFP 100. The CPU 201 writes data to the liquid crystal display unit 401 of the console unit 106, to thereby display information thereon. The CPU 201 receives an instruction from the user as input by reading data out of the keyboard 204 or the liquid crystal display unit 401 serving as a touch panel. Information input to the CPU 201 is stored on one of the memory 202, the disk 211, and the CPU 201 to be used in various types of processing.

The bus 209 is connected to the network interface 105. The CPU 201 holds two-way communication to and from the PC 107 and other external devices by reading data out of the network interface 105 or writing data to the network interface 105. The bus 209 is connected to the modem 108. The CPU 201 uses the modem 108 to transmit/receive a facsimile image over the public switched telephone network 109. The bus 209 is also connected to the printer engine 103, the finisher 104, and the scanner engine 102. The CPU 201 reads/writes data in the printer engine 103, the finisher 104, and the scanner engine 102 to perform printing (image forming) operation, book binding operation, and scanning (image reading) operation, and to obtain statuses of various matters. Image data is input to the controller 101 from one of the scanner engine 102 and the network interface 105, and is stored on one of the disk 211 and the memory 202. Image data may also be taken into the controller 101 out of a memory medium when the image data is stored on a removable memory medium in advance and the memory medium is loaded in the MFP 100.

The image forming apparatus according to the first embodiment is not limited to the MFP 100, and may be a single function printer (SFP). The scanner unit 301, the printer unit 302, and the finisher 104 may each be provided on one of the LAN 220 and the public switched telephone network 109, instead of inside the MFP 100, as a stand-alone peripheral device controlled by the controller 101.

(Console Unit)

Figure 3:
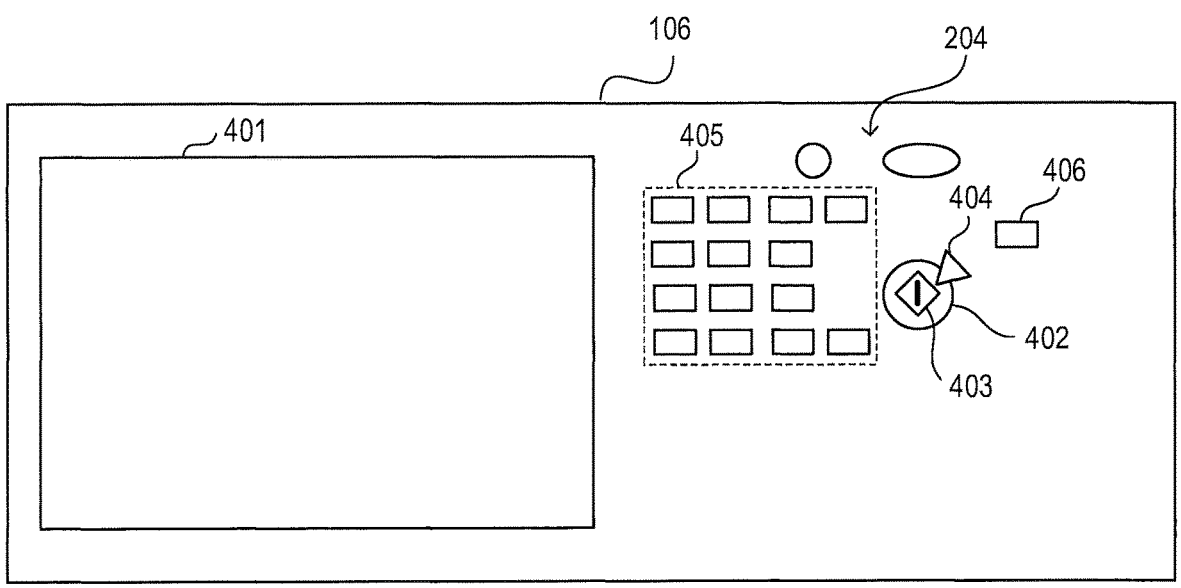
FIG. 3 is a diagram for illustrating a console unit.

The console unit 106 is described with reference to FIG. 3. FIG. 3 is a diagram for illustrating the console unit 106. The liquid crystal display unit 401 has a touch panel sheet adhered to a surface of a liquid crystal panel. The liquid crystal display unit 401 displays an operation screen and soft keys. When one of the displayed soft keys is touched by the user, the liquid crystal display unit 401 transmits position information of the touch to the CPU 201 of the controller 101. The keyboard 204 includes a start key 402, a stop key 404, a numeric keypad 405, and a user mode key 406. When an image of a document is to be read, for example, the user presses the start key 402 to start the operation of reading the image of the document. A green/red bi-color LED 403 is provided in a central portion of the start key 402. When the bi-color LED 403 is emitting green light, the start key 402 is usable. The start key 402 is unusable when the bi-color LED 403 is emitting red light. When the stop key 404 is pressed, operation that is being executed is stopped. The numeric keypad 405 includes a group of number buttons and a group of character buttons. The user uses the numeric keypad 405 to set the number of copies to be made, and to instruct the liquid crystal display unit 401 to switch screens. The user mode key 406 is pressed by the user when a device is to be set.

((Sheet Attribute Setting Screen))

Figure 4A:
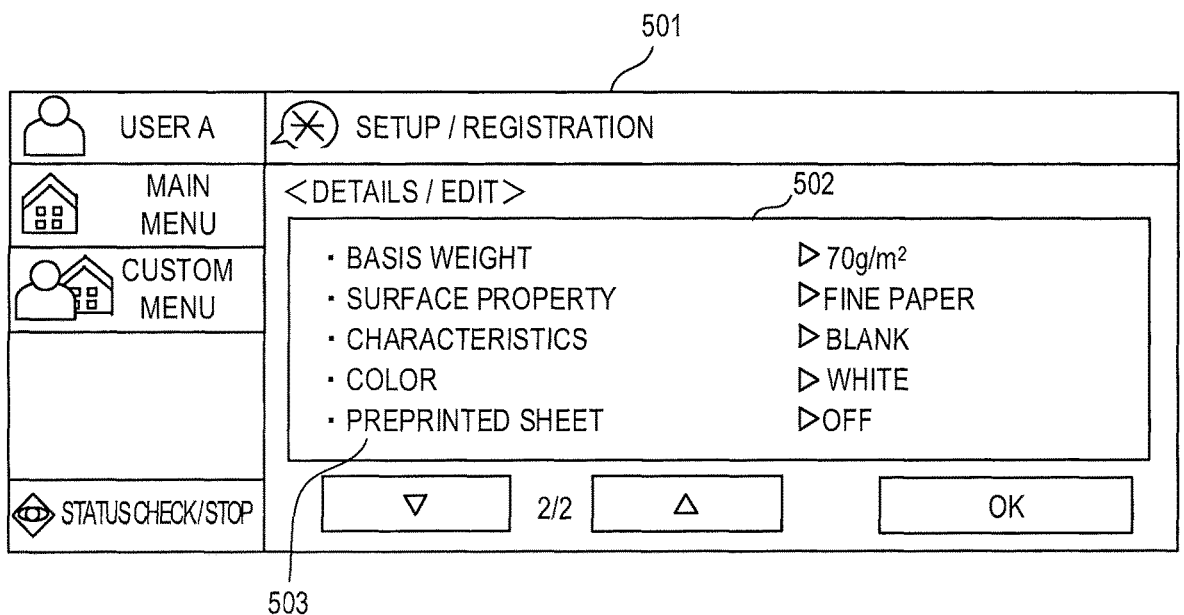
FIG. 4A is a diagram for illustrating a sheet attribute setting screen.
Figure 4B:
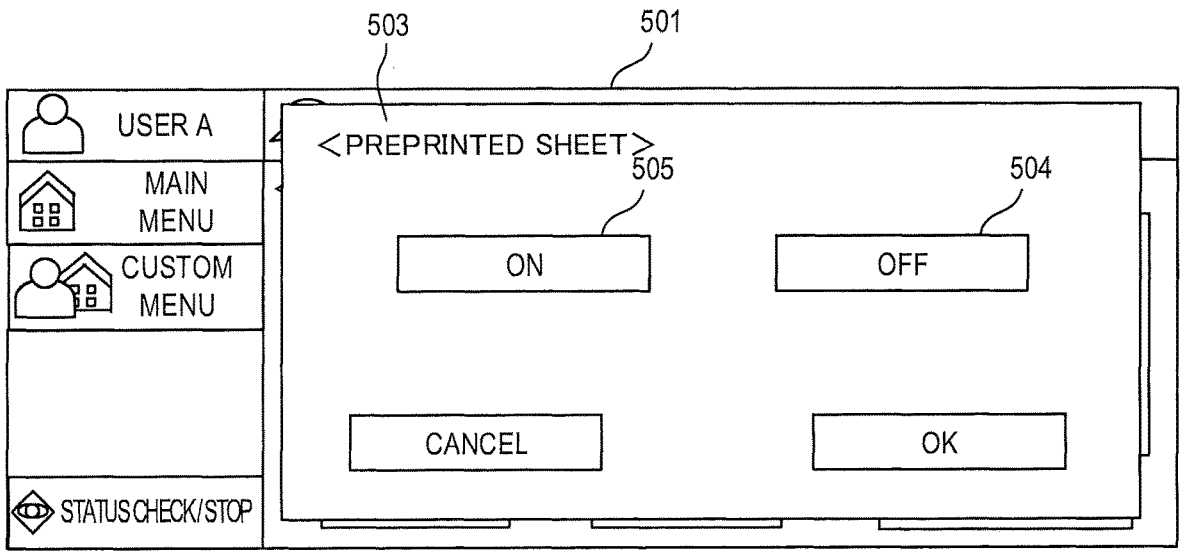
FIG. 4B is a diagram for illustrating a print surface priority mode setting screen.

An example of a sheet attribute setting screen 501, which is displayed on the liquid crystal display unit 401 upon instruction from the CPU 201 of the controller 101, is described with reference to FIG. 4A and FIG. 4B. FIG. 4A is a diagram for illustrating the sheet attribute setting screen 501. The sheet attribute setting screen 501 displays, for each sheet identifier (hereinafter referred to as "sheet ID") as a sheet type, set values of sheet attributes (attribute information) 502. The sheet attributes 502 include a basis weight, surface properties, characteristics, a color, and a preprinted sheet mode (hereinafter referred to as "print surface priority mode") 503. The user is allowed to change set values of the sheet attributes 502 on the sheet attribute setting screen 501. The sheet attributes 502 are stored on the memory (storage portion) 202. The print surface priority mode 503 is a print surface priority attribute for determining whether a sheet is to be passed along a double-sided conveying path (hereinafter referred to as "re-conveying path") 612 (FIG. 6) for duplex printing in the case of simplex printing. FIG. 4B is a diagram for illustrating a print surface priority mode setting screen. The user touches one of an ON button 505 and an OFF button 504 on the print surface priority mode setting screen illustrated in FIG. 4B, to thereby change the on/off setting of the print surface priority mode 503. When the print surface priority mode 503 is on, a sheet is passed along the re-conveying path 612 (FIG. 6) for duplex printing in simplex printing without having a first side (upper surface) of the sheet subjected to printing and, after the sheet is reversed, an image of a front side is printed on the sheet's second side (lower surface), which is opposite from the first side. This makes an image of the front side printed on the lower surface of a sheet set in the feeding cassette 601 in both simplex printing and duplex printing, and the sheet is discharged to a discharge portion 605 with the lower surface on which the image of the front side has been printed facing downward. When the print surface priority mode 503 is off, an image is printed on the first side (upper surface) of a sheet in simplex printing.

(Sheet Conveying Path)

Figure 5:
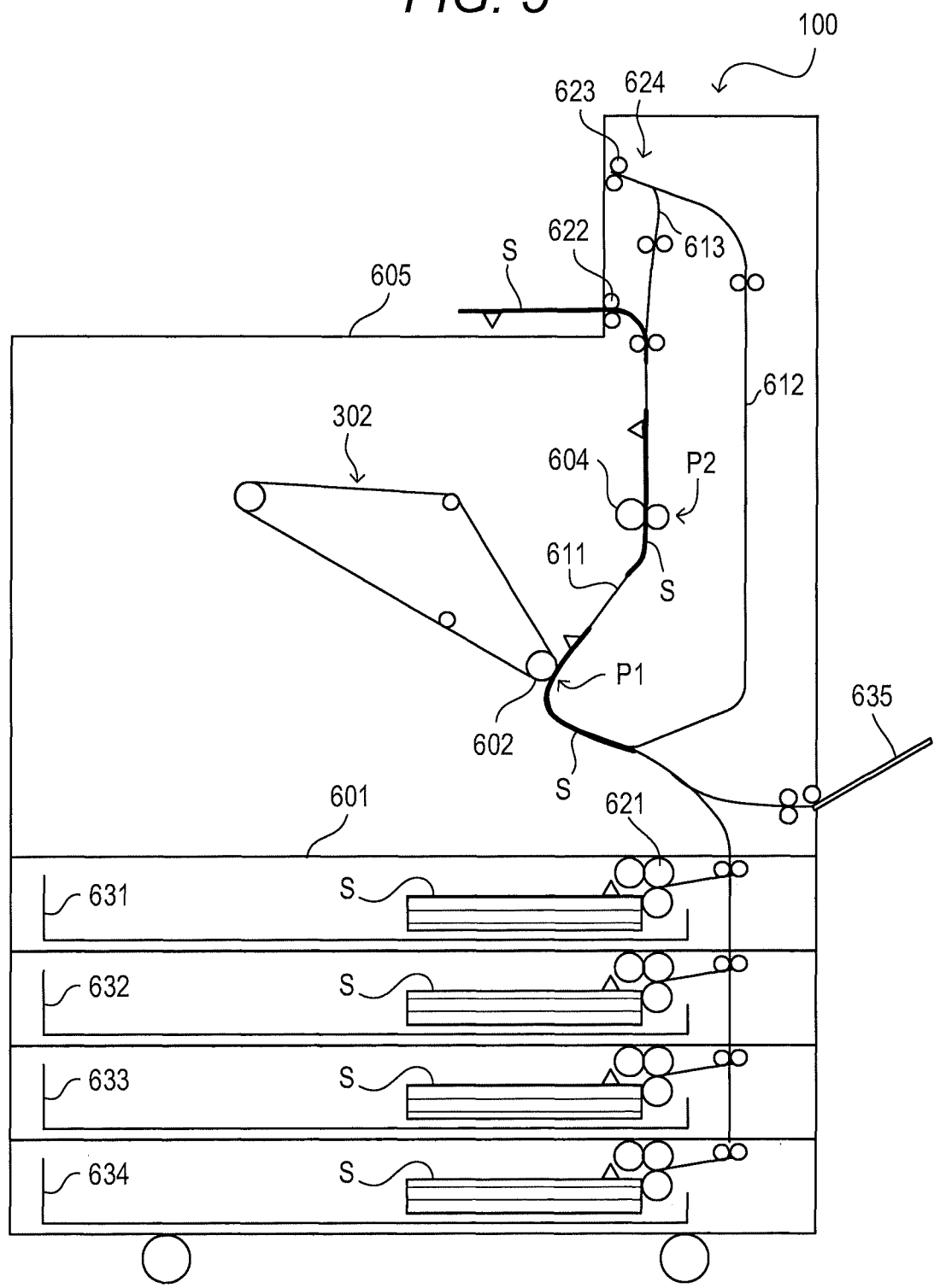
FIG. 5 is a diagram for illustrating a sheet conveying path that is used when the print surface priority mode is off in simplex printing.

A conveying path along which a sheet S is conveyed in simplex printing of the MFP 100 in the first embodiment when the print surface priority mode 503 is off is described with reference to FIG. 5. FIG. 5 is a diagram for illustrating the conveying path along which the sheet S is conveyed in simplex printing when the print surface priority mode 503 is off. The CPU 201 obtains information indicating which of simplex printing and duplex printing is set in print settings from the settings of a received print job. The CPU 201 also determines whether the print surface priority mode 503 is on from sheet attributes that are associated with a sheet type included in the received print job. When the print surface priority mode 503 is off in simplex printing, the MFP 100 operates in a speed priority mode (first mode). The MFP 100 has a configuration in which printing on the sheet S is performed while the sheet S is conveyed in a vertical direction (an image forming apparatus having this configuration is hereinafter referred to as "vertical path machine"). A conveying path 611 stretches from feeding rollers 622 through a transfer portion 602 and a fixing portion 604 to discharge rollers 621. In FIG. 5, a Δ mark is attached to indicate the upper surface of the sheet S at the top of each stack of sheets S stacked in the feeding cassette 601.

The feeding cassette 601 serving as a feeding unit includes a plurality of feeding cassettes (hereinafter referred to as "a plurality of feeding units"). The plurality of feeding units in the first embodiment include a first feeding unit 631, a second feeding unit 632, a third feeding unit 633, and a fourth feeding unit 634. The plurality of feeding units may further include a fifth feeding unit 635 as a manual feed tray.

The sheet S is conveyed by the feeding rollers 621 from the feeding cassette 601 to a point P1. At the point P1, a toner image is transferred to the sheet S by the transfer portion 602. The sheet S is conveyed to a point P2. At the point P2, the toner image is fixed to the sheet S by the fixing portion 604. The sheet S having an image of the front side formed on its upper surface is discharged by the discharge rollers 622 to the discharge portion 605 with the upper surface on which the image of the front side has been formed facing downward. In this manner, an image of the front side is formed on the upper surface of the sheet S set in the feeding cassette 601 and the sheet S is discharged to the discharge portion 605 with the upper surface on which the image of the front side has been formed facing downward when the print surface priority mode 503 is off in simplex printing. Here, an image formed in simplex printing is referred to as an "image of the front side".

Figure 6:
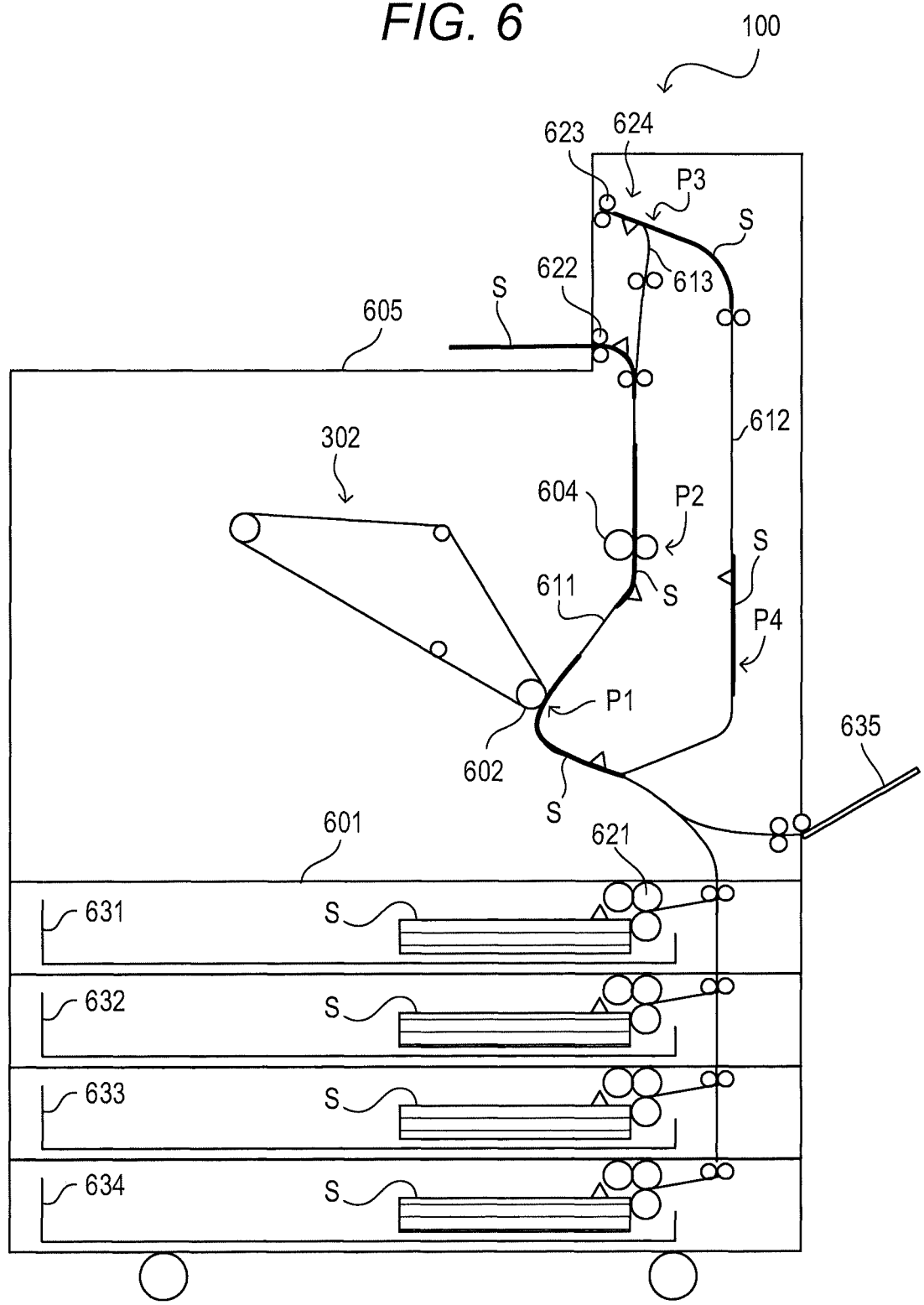
FIG. 6 is a diagram for illustrating a sheet conveying path in duplex printing.

The conveying path along which the sheet S is conveyed in duplex printing of the MFP 100 in the first embodiment is described with reference to FIG. 6. The re-conveying path 612 stretches from a point between the fixing portion 604 and the discharge rollers 622 to a point between the feeding rollers 621 and the transfer portion 602. The re-conveying path 612 is provided with a reverse portion 624. The reverse portion 624 is provided with a reverse path 613 and reverse rollers 623. The reverse portion 624 reverses the sheet S that has been conveyed along the conveying path 611 and passed through the printer unit 302 so that the sheet S is conveyed along the re-conveying path 612. As in FIG. 5, a Δ mark is attached in FIG. 6 to indicate the upper surface of the sheet S at the top of each stack of sheets S stacked in the feeding cassette 601. The sheet S is conveyed along the same path as in FIG. 5 when an image of the back side is printed on the upper surface (first side) of the sheet S fed from the feeding cassette 601, and the illustration of this path is therefore omitted from FIG. 6. After the image of the back side is fixed to the upper surface (first side) of the sheet S, the sheet S is conveyed to a point P3 on the reverse path 613 by the action of a conveying path switching flapper (not shown). The sheet S is switched back by the backward rotation of the reverse rollers 623 to be conveyed from the point P3 to a point P4 on the re-conveying path 612, with the trailing end of the sheet S first. The sheet S then returns to the conveying path 611, and a toner image of the front side is transferred to the lower surface (second side) of the sheet S at the point P1 by the transfer portion 602. At the point P2, the toner image of the front side is fixed to the lower surface (second side) of the sheet S by the fixing portion 604. The sheet S having the image of the front side formed on the lower surface (second side) is discharged by the discharge rollers 622 to the discharge portion 605 with the lower surface (second side) on which the image of the front side has been formed facing downward. In this manner, an image of the front side is formed on the lower surface (second side) of the sheet S set in the feeding cassette 601, and the sheet S is discharged to the discharge portion 605 with the lower surface (second side) on which the image of the front side has been formed facing downward in duplex printing. Here, out of two images to be formed on the front side and back side of the sheet S in duplex printing, an image of the preceding page is referred to as "image of the front side" and an image of the subsequent page is referred to as "image of the back side". In duplex printing, an image of the back side being an image of the subsequent page is formed on the sheet S before an image of the front side being an image of the preceding page.

When an image is to be printed in the first embodiment on the sheet S whose front side and back side are different from each other, for example, pre-punched paper, preprinted paper, letter-headed paper, or label paper, the sheet S and other sheets S are stacked in the feeding cassette 601 with the front side of each sheet S facing downward. In the case of the fifth feeding unit 635, which serves as a manual feed tray, the sheet S and other sheets S are stacked in the fifth feeding unit 635 with the front side of each sheet S facing upward. The user sets the print surface priority mode to "on" for the sheet ID of the sheet S. In duplex printing, an image of the back side is formed on the upper surface (back side) of the sheet S set in the feeding cassette 601, an image of the front side is formed on the lower surface (front side) of the sheet S, and the sheet S is discharged to the discharge portion 605 with the lower surface (front side) on which the image of the front side has been formed facing downward, as described above. When the print surface priority mode 503 is on in simplex printing, the sheet S is conveyed along the conveying path for duplex printing illustrated in FIG. 6, instead of the conveying path illustrated in FIG. 5. However, no image is formed on the upper surface (back side) of the sheet S set in the feeding cassette 601, an image of the front side is formed on the lower surface (front side) of the sheet S, and the sheet S is discharged to the discharge portion 605 with the lower surface (front side) on which the image of the front side has been formed facing downward.

According to the first embodiment, when the print surface priority mode is set to "on" for the sheet ID of the sheet S, an image of the front side is formed on the lower surface (front side) of the sheet S set in the feeding cassette 601 irrespective of whether simplex printing or duplex printing is to be performed. The sheet S is then discharged to the discharge portion 605 with the lower surface (front side) on which the image of the front side has been formed facing downward (the same direction). In other words, according to the first embodiment, the sheet S is conveyed along the re-conveying path 612, which is a conveying path for duplex printing, in simplex printing when the print surface priority mode is enabled for the sheet ID of the sheet S. This enables the MFP 100 to discharge the sheet S to the discharge portion 605 with the lower surface (front side) on which an image of the front side has been formed facing downward in both simplex printing and duplex printing, and can accordingly prevent the printing time of duplex printing from stretching longer than required.

Figure 7A:
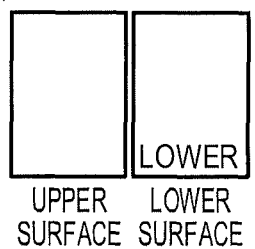
FIG. 7A, FIG. 7B, FIG. 7C, and FIG. 7D are explanatory diagrams for illustrating on which of the upper surface and lower surface of a sheet an image of the front side is to be formed.
Figure 7B:
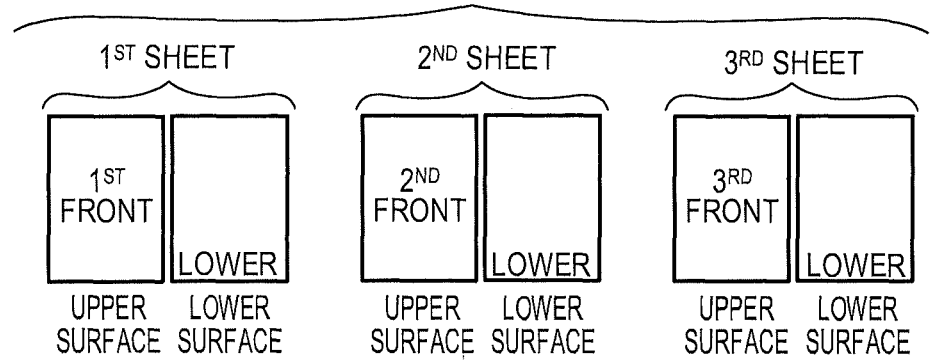
Figure 7C:
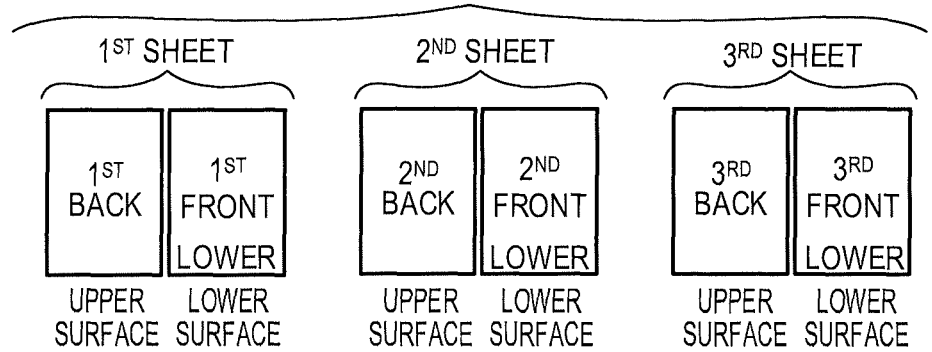
Figure 7D:
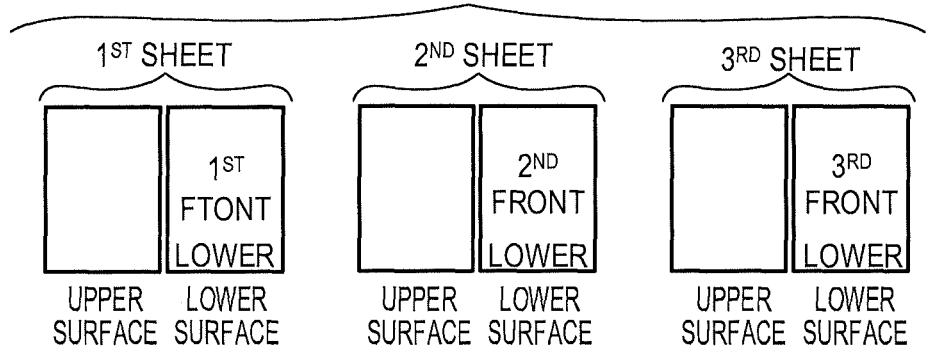

On which of the upper surface and lower surface of a sheet set in the feeding cassette 601 an image of the front side is to be formed in simplex printing and duplex printing in the MFP 100 is described with reference to FIG. 7A, FIG. 7B, FIG. 7C, and FIG. 7D. FIG. 7A to FIG. 7D are explanatory diagrams for illustrating on which of the upper surface and lower surface of a sheet an image of the front side is to be formed. It is assumed that sheets whose front side and back side are different from each other (preprinted sheets) are stacked in the feeding cassette 601. For the sake of description, it is assumed that letters "LOWER" have been printed on the lower surface of each of the sheets set in the feeding cassette 601 while the upper surface of the sheet is blank as illustrated in FIG. 7A. FIG. 7B is a diagram for illustrating an example of sheets on which an image of the front side is formed when the print surface priority mode is off in simplex printing. In each of the first sheet to the third sheet, the image of the front side is printed on the upper surface of the sheet. FIG. 7C is a diagram for illustrating an example of sheets on which an image of the front side and an image of the back side are formed in duplex printing. In order to discharge a sheet with the front side of the sheet facing downward in the MFP 100, an image of the back side is formed first on the upper surface of the sheet, the sheet is next reversed, and an image of the front side is formed on the lower surface of the sheet. As is understood from a comparison between FIG. 7B and FIG. 7C, the surface on which an image of the front side is formed differs between simplex printing and duplex printing, with the image formed on the upper surface of the sheet in simplex printing and on the lower surface of the sheet in duplex printing. When a sheet whose front side and back side are different from each other is set and a sheet ID for which the print surface priority mode is enabled is set in the first embodiment in order to print an image of the front side on the lower surface of the sheet in simplex printing as in duplex printing, the sheet is conveyed along the re-conveying path 612 despite the printing being simplex printing. FIG. 7D is a diagram for illustrating an example of sheets on which an image of the front side is formed when the print surface priority mode is on in simplex printing. In each of the first sheet to the third sheet, an image of the front side is printed on the lower surface of the sheet. The image of the front side is formed on the lower surface of the sheet in both simplex printing and duplex printing, which means that the surface on which an image of the front side is formed is the same in simplex printing and duplex printing, as is proven by a comparison between FIG. 7C and FIG. 7D.

Figure 8:
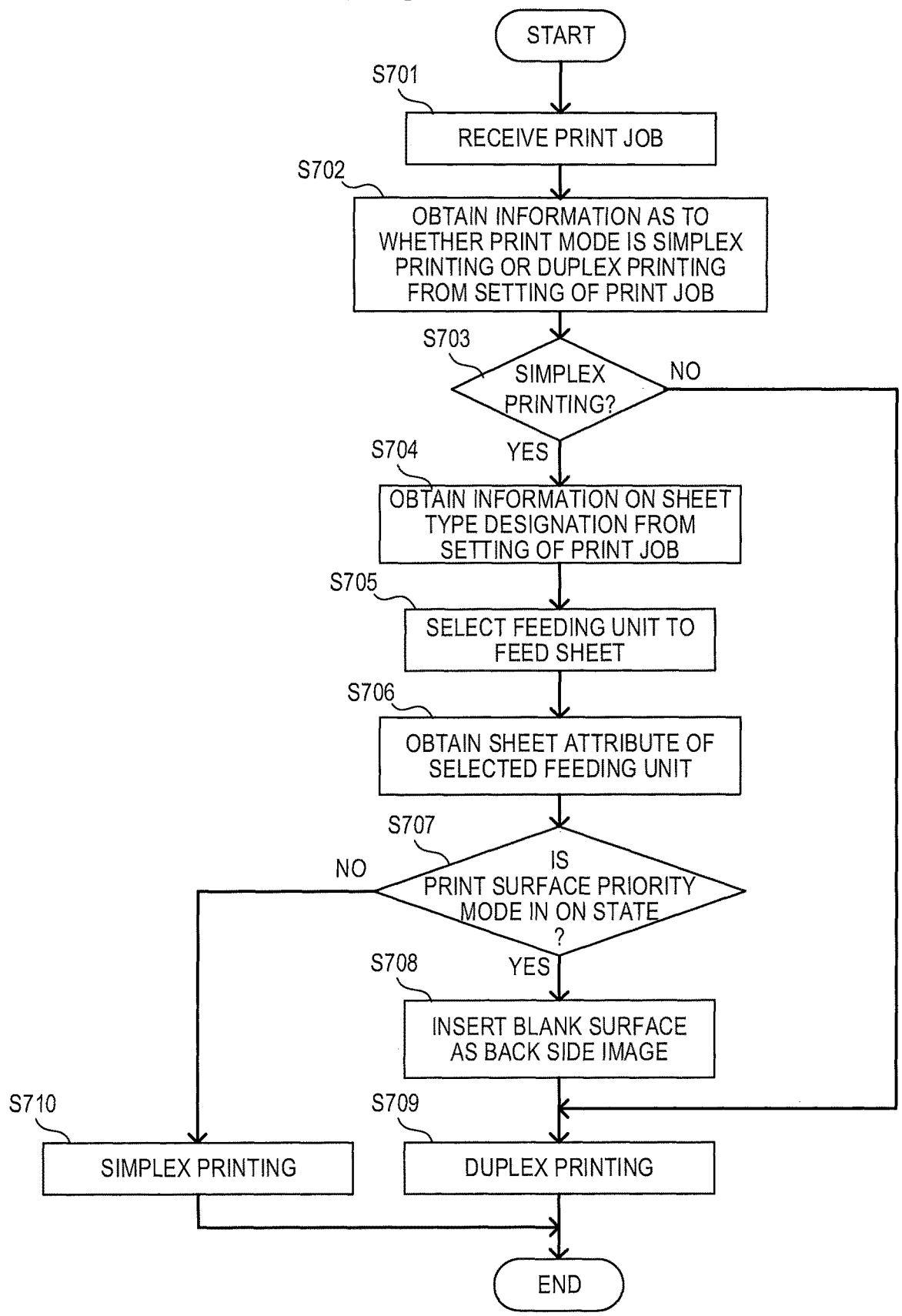
FIG. 8 is a flow chart for illustrating printing operation, which is executed by a CPU.

(Printing Operation) FIG. 8 is a flow chart for illustrating a printing operation, which is executed by the CPU 201. In the first embodiment, the CPU 201 of the controller 101 determines whether to switch the print settings from simplex printing to duplex printing, depending on whether the print surface priority mode is on. A program for the printing operation is stored in one of the ROM 210 and the disk 211. The CPU 201 reads the program out of one of the ROM 210 and the disk 211 onto the memory 202, and executes the printing operation.

When the printing operation is started, the CPU 201 receives a print job in Step S701. In Step S702, the CPU 201 obtains information indicating which of simplex printing and duplex printing is set in the print settings from the settings of the print job received in Step S701. An example of how a print job is set is described with reference to FIG. 9. FIG. 9 is a diagram for illustrating a print driver screen 1001 when printing is instructed from the PC 107. The user selects a "designate by sheet type" button 1002 in a "how to designate sheet" box on a feeding tab. A print job includes, as sheet designation, feeding unit designation in which a feeding unit is designated to designate a sheet, and sheet type designation in which a sheet type is designated to designate a sheet. A feeding unit is selected based on the sheet designation. In this example, the "designate by sheet type" button 1002 is selected instead of a "designate by feeding unit" button. The user designates a sheet type in a box 1003. "Sheet ID1" is designated in this example, thereby setting "Sheet ID1" in the print job. The CPU 201 controls the MFP 100 based on the settings of the print job, so that the printing operation for printing on a sheet whose sheet ID is "Sheet ID1" is executed. FIG. 10 is a diagram for illustrating a data structure 1101 of a print job. The settings of a print job include the number of copies, feeding unit designation, sheet size designation, sheet type designation 1102, and designation 1103 of simplex/duplex printing. In the example of the data structure 1101 illustrated in FIG. 10, "Sheet ID1" is designated as a sheet type for the sheet type designation 1102, and simplex printing is designated for the designation 1103 of simplex/duplex printing.

In Step S703, the CPU 201 determines whether simplex printing is set in the print settings from the information obtained in Step S702. When duplex printing is set in the print settings ("NO" in Step S703), the CPU 201 advances the processing to Step S709. When simplex printing is set in the print settings ("YES" in Step S703), on the other hand, the CPU 201 advances the processing to Step S704. In Step S704, the CPU 201 obtains information on sheet type designation from the settings of the received print job. In Step S705, the CPU 201 selects a feeding unit from which a sheet is to be fed, based on the information on sheet type designation. In Step S706, the CPU 201 obtains the sheet attributes of sheets stacked in the selected feeding unit.

Figure 11:
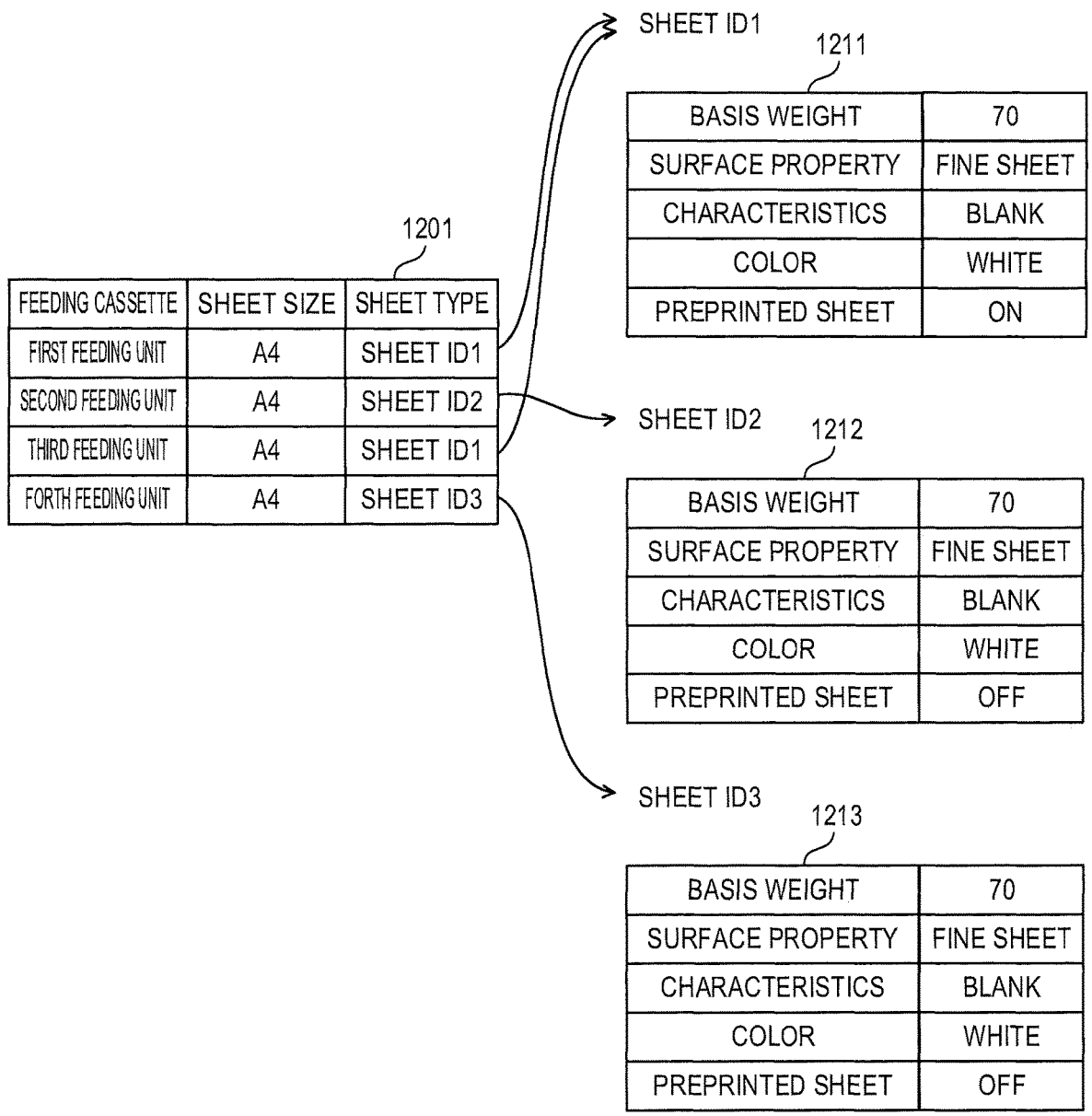
FIG. 11 is a diagram for illustrating a data structure whose components include feeding units and sheet types.

The association relationship between a feeding unit and sheet attributes is described with reference to FIG. 11. FIG. 11 is a diagram for illustrating a data structure whose components include feeding units and sheet types. A data structure 1201 in which, for each of the first feeding unit 631, the second feeding unit 632, the third feeding unit 633, and the fourth feeding unit 634, a sheet type associated with the feeding unit is stored on one of the memory 202 and the disk 211. One of "Sheet ID1", "Sheet ID2", and "Sheet ID3" is designated for each feeding unit as the sheet type associated with the feeding unit. For instance, "Sheet ID1", "Sheet ID2", "Sheet ID1", and "Sheet ID3" are designated as the sheet types of the first feeding unit 631, the second feeding unit 632, the third feeding unit 633, and the fourth feeding unit 634, respectively, as illustrated in FIG. 11. Sheet attributes 1211, sheet attributes 1212, and sheet attributes 1213 are associated with "Sheet ID1", "Sheet ID2", and "Sheet ID3", respectively, and the data structures of the sheet attributes 1211, the sheet attributes 1212, and the sheet attributes 1213 are stored on one of the memory 202 and the disk 211. Information indicating, for each sheet ID, whether the value of the print surface priority mode (preprinted sheet mode) that is associated with the sheet ID is "on" or "off" can be obtained from the data structures of the sheet attributes 1211, the sheet attributes 1212, and the sheet attributes 1213. Set values of the sheet attributes 1211, the sheet attributes 1212, and the sheet attributes 1213 can be changed on the sheet attribute setting screen 501 illustrated in FIG. 4A.

When the sheet type is "Sheet ID1", for example, the CPU 201 automatically selects one of the first feeding unit 631 and the third feeding unit 633 in Step S705, and obtains the sheet attributes 1211 associated with "Sheet ID1" in Step S706. When the sheet type is "Sheet ID2", the CPU 201 automatically selects the second feeding unit 632 in Step S705, and obtains the sheet attributes 1212 associated with "Sheet ID2" in Step S706. When the sheet type is "Sheet ID3", the CPU 201 automatically selects the fourth feeding unit 634 in Step S705, and obtains the sheet attributes 1213 associated with "Sheet ID3" in Step S706.

In Step S707, the CPU 201 determines whether the print surface priority mode is on from the sheet attributes obtained in Step S706. When the print surface priority mode is on ("YES" in Step S707), the CPU 201 advances the processing to Step S708. In Step S708, the CPU 201 inserts image data of a blank surface as image data of the back side to image data of simplex printing. In Step S709, the CPU 201 performs duplex printing. In duplex printing, the sheet is passed along the re-conveying path 612 without having the first side (upper surface) of the sheet subjected to printing and, after the sheet is reversed, an image of the front side is formed on the second side (lower surface) of the sheet as described above. This makes the image of the front side printed on the lower surface of the sheet set in one of the first feeding unit 631 and the third feeding unit 633, and the sheet is discharged to the discharge portion 605 with the lower surface on which the image of the front side has been formed facing downward. The CPU 201 then ends the printing operation. When the print surface priority mode is off ("NO" in Step S707), on the other hand, the CPU 201 advances the processing to Step S710. In Step S710, the CPU 201 performs simplex printing in the speed priority mode (first mode) described with reference to FIG. 5. An image of the front side is formed on the first side (upper surface) of the sheet, and the sheet is discharged to the discharge portion 605 without being passed along the re-conveying path 612. The CPU 201 then ends the printing operation.

According to the first embodiment, in the printing of an image on a sheet whose front side and back side are different from each other, a sheet that has been set in a feeding unit with the front side facing downward for duplex printing is not required to be re-set in the feeding unit with the front side facing upward for simplex printing. The first embodiment enables an image forming apparatus to perform simplex printing in one of the speed priority mode (the first mode) and the print surface priority mode (a second mode) depending on attribute information, which is associated with a sheet type.

Second Embodiment

A second embodiment of the present invention is described below. In the second embodiment, a structure that is the same as the one in the first embodiment is denoted by the same reference symbol, and a description on the structure is omitted. The MFP 100, the control system 10, the console unit 106, the sheet attribute setting screen 501, sheet conveying paths, and printing operation in the second embodiment are the same as those in the first embodiment, and descriptions thereof are accordingly omitted. In the first embodiment, a print job includes one of sheet designation in which a feeding unit is designated to designate a sheet and sheet designation in which a sheet type is designated to designate a sheet, and a feeding unit is selected based on the sheet designation. In contrast, the MFP 100 in the second embodiment automatically selects a feeding unit from a group of feeding units that excludes one for which the print surface priority mode is set to "on", when a print job includes neither feeding unit designation nor sheet type designation. The following is a description on the feeding unit automatic selection in the second embodiment.

(Feeding Unit Automatic Selection)

Figure 12:
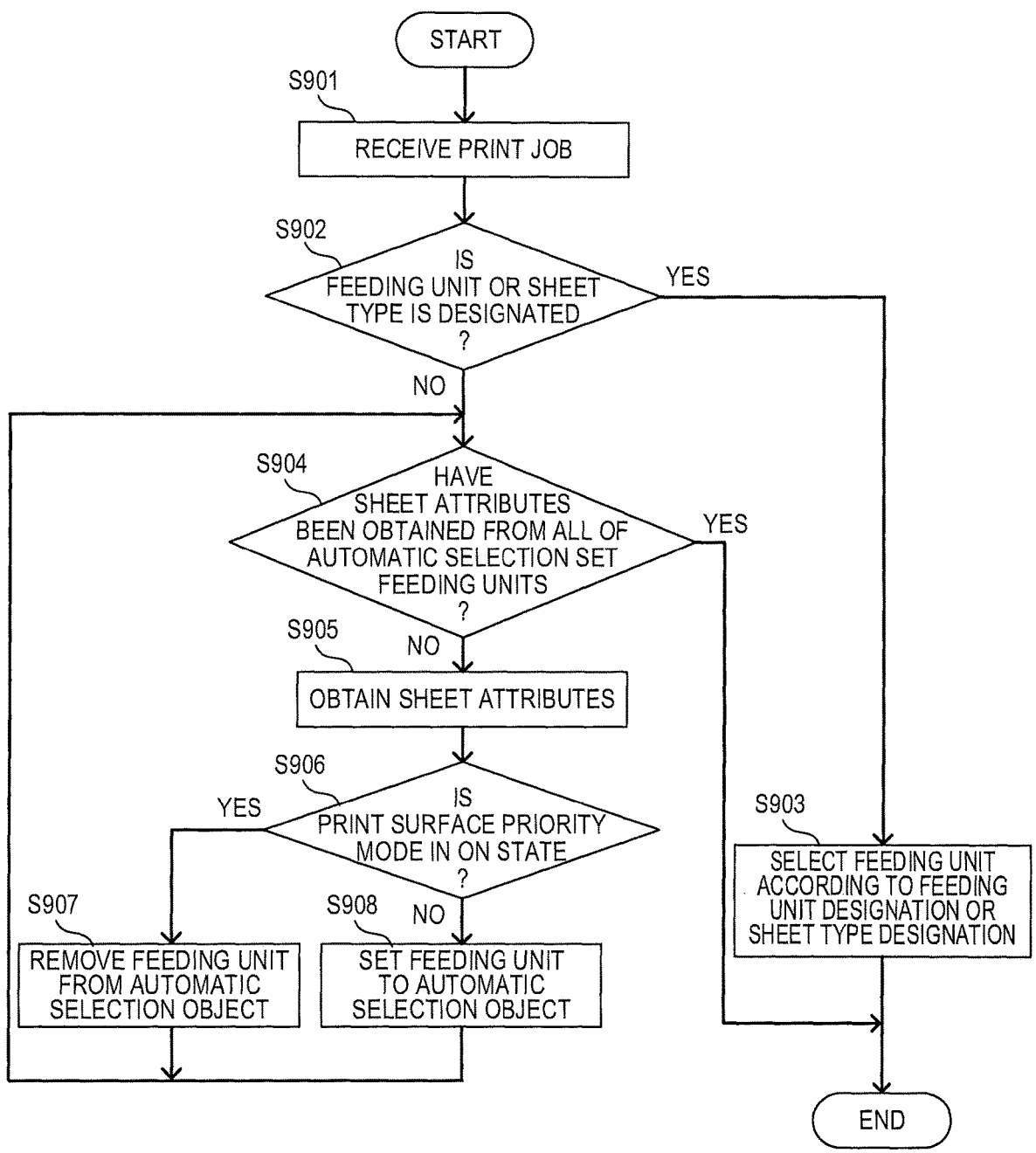
FIG. 12 is a flow chart for illustrating a feeding unit automatic selection operation, which is executed by the CPU.
Figure 13A:
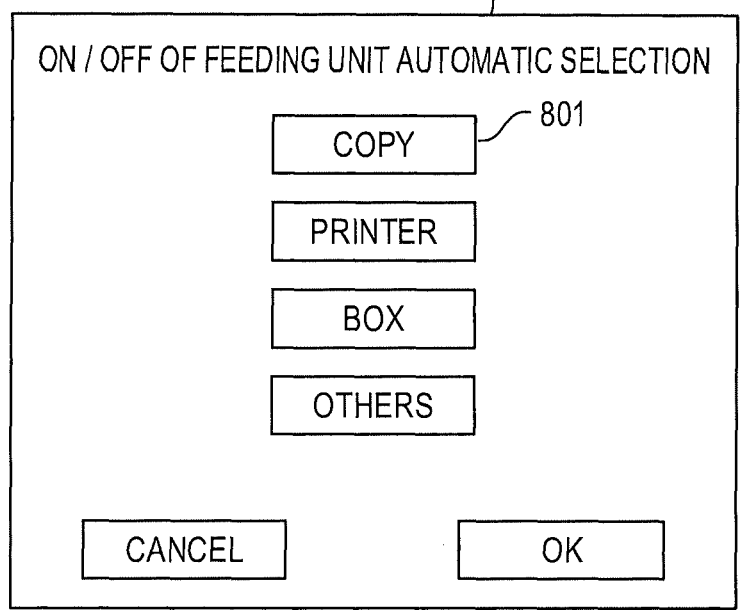
FIG. 13A and FIG. 13B are diagrams for illustrating screens on which automatic selection of a feeding unit is to be set.
Figure 13B:
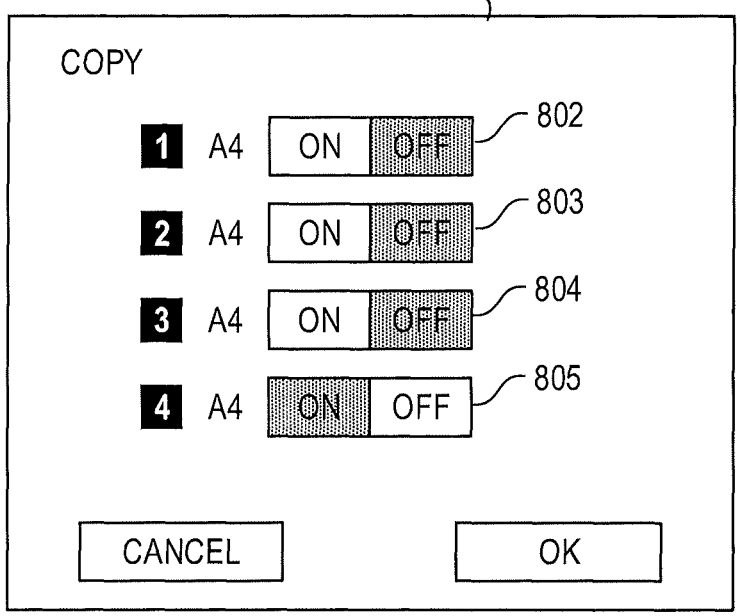

The feeding unit automatic selection in the second embodiment is described below with reference to FIG. 12, FIG. 13A, and FIG. 13B. FIG. 12 is a flow chart for illustrating feeding unit automatic selection operation, which is executed by the CPU 201. In the second embodiment, the CPU 201 of the controller 101 determines feeding units available for automatic selection, based on whether the print surface priority mode is set to "on" or "off" in the sheet attributes 502. A program for the feeding unit automatic selection operation is stored on one of the ROM 210 and the disk 211. The CPU 201 reads the program out of one of the ROM 210 and the disk 211 onto the memory 202, and executes the feeding unit automatic selection operation.

When the feeding unit automatic selection operation is started, the CPU 201 receives a print job in Step S901. In Step S902, the CPU 201 determines whether the print job received in Step S901 includes one of feeding unit designation and sheet type designation. When the print job includes one of feeding unit designation and sheet type designation ("YES" in Step S902), the CPU 201 advances the processing to Step S903. In Step S903, the CPU 201 selects a feeding unit based on one of the feeding unit designation and the sheet type designation. The CPU 201 then ends the feeding unit automatic selection operation. When the print job includes neither feeding unit designation nor sheet type designation ("NO" in Step S902), on the other hand, the CPU 201 advances the processing to Step S904. In Step S904, the CPU 201 determines whether sheet attributes have been obtained from every feeding unit set as an automatic selection object.

How to set a feeding unit as an automatic selection object is described with reference to FIG. 13A and FIG. 13B. FIG. 13A and FIG. 13B are diagrams for illustrating screens 511 and 512, respectively, for setting automatic selection of a feeding unit. The screens 511 and 512 are displayed on the liquid crystal display unit 401 of the console unit 106. FIG. 13A is a diagram for illustrating the screen 511 as a screen to select a job for which automatic selection of a feeding unit is to be set. The screen 511 illustrated in FIG. 13A as a screen on which automatic selection of a feeding unit is set is displayed on the liquid crystal display unit 401. Whether feeding unit automatic selection is on or off can be set for each of the job types, including "copy" and "printer". When a copy button 801 on the screen 511 illustrated in FIG. 13A is touched, the screen 512 illustrated in FIG. 13B is displayed on the liquid crystal display unit 401. FIG. 13B is a diagram for illustrating a set button 802, a set button 803, a set button 804, and a set button 805 for the first feeding unit 631, the second feeding unit 632, the third feeding unit 633, and the fourth feeding unit 634, respectively, which can be set as automatic selection objects in a copy job. In the example of FIG. 13B, the set buttons 802, 803, and 804 are set to "on", which means that the first feeding unit 631, the second feeding unit 632, and the third feeding unit 633 are automatic selection objects in a copy job. The set button 805 is set to "off", which means that the fourth feeding unit 634 is excluded from automatic selection objects. Information about which feeding unit is set as an automatic selection object is stored on the memory 202.

When sheet attributes have not been obtained from every feeding unit set as an automatic selection object ("NO" in Step S904), the CPU 201 obtains the sheet attributes 1211 of the first feeding unit 631, which is an automatic selection object, in Step S905. The association relationship between a feeding unit and sheet attributes in the second embodiment is the same as the association relationship described in the first embodiment with reference to FIG. 11. In Step S906, the CPU 201 determines whether the print surface priority mode is on from the sheet attributes 1211 obtained in Step S905. In the example of FIG. 11, the print surface priority mode is set to "on" in the sheet attributes 1211 of the first feeding unit 631 ("YES" in Step S906), and the CPU 201 accordingly excludes the first feeding unit 631 from automatic selection objects in Step S907. The CPU 201 then returns the processing to Step S904.

The sheet attributes have not been obtained from every feeding unit set as an automatic selection object ("NO" in Step S904), and hence the CPU 201 obtains the sheet attributes 1212 of the second feeding unit 632, which is an automatic selection object, in Step S905. In Step S906, the CPU 201 determines whether the print surface priority mode is on from the sheet attributes 1212 obtained in Step S905. In the example of FIG. 11, the print surface priority mode is set to "off" in the sheet attributes 1212 of the second feeding unit 632 ("NO" in Step S906), and the CPU 201 accordingly selects the second feeding unit 632 as an automatic selection object in Step S908. The CPU 201 then returns the processing to Step S904.

The sheet attributes have not been obtained from every feeding unit set as an automatic selection object ("NO" in Step S904), and hence the CPU 201 obtains the sheet attributes 1211 of the third feeding unit 633, which is an automatic selection object, in Step S905. In Step S906, the CPU 201 determines whether the print surface priority mode is on from the sheet attributes 1211 obtained in Step S905. In the example of FIG. 11, the print surface priority mode is set to "on" in the sheet attributes 1211 of the third feeding unit 633 ("YES" in Step S906), and the CPU 201 accordingly excludes the third feeding unit 633 from automatic selection objects in Step S907. The CPU 201 then returns the processing to Step S904.

The fourth feeding unit 634 is excluded from automatic selection objects, and the CPU 201 accordingly determines in Step S904 that sheet attributes have been obtained from every feeding unit set as an automatic selection object ("YES" in Step S904). The CPU 201 then ends the feeding unit automatic selection operation. In this manner, the first feeding unit 631 and the third feeding unit 633 for which the print surface priority mode is set to "on" in the example of FIG. 11 are removed from the first feeding unit 631, the second feeding unit 632, and the third feeding unit 633, which are set as automatic selection objects in the example of FIG. 13B. This leaves the second feeding unit 632 as the only automatic selection object.

According to the second embodiment, a feeding unit associated with sheet attributes in which the print surface priority mode is set to "on" is excluded from automatic selection objects. Consequently, even when a feeding unit is to be automatically selected and sheets whose front side and back side are different from each other are stacked in a feeding unit that is associated with sheet attributes in which the print surface priority mode is set to "on", a situation in which an image of the front side is formed on the back side of a sheet that is fed from this feeding unit by mistake can be prevented.

Third Embodiment

A third embodiment of the present invention is described below. In the third embodiment, a structure that is the same as the one in the first embodiment is denoted by the same reference symbol, and a description on the structure is omitted. The MFP 100, the control system 10, the console unit 106, the sheet attribute setting screen 501, sheet conveying paths, and printing operation in the third embodiment are the same as those in the first embodiment, and descriptions thereof are accordingly omitted. In the first embodiment and the second embodiment, simplex printing is performed in one of the first mode in which a sheet is not passed along the re-conveying path 612 and the second mode in which a sheet is passed along the re-conveying path 612, depending on attribute information, which is associated with a sheet type. However, some sheets and feeding units are unsuitable for simplex printing in the second mode in which a sheet is passed along the re-conveying path 612. It is therefore required to prevent attribute information that indicates simplex printing in the second mode from being set by mistake for a sheet and a feeding unit that are unsuitable for simplex printing in the second mode. The third embodiment addresses this by displaying a screen for calling the user's attention so that a mode in which a sheet is passed along the re-conveying path 612 to be subjected to simplex printing is prevented from being set by mistake when simplex printing in which a sheet is passed along the re-conveying path 612 cannot be performed.

In the third embodiment, an image of the front side is formed on the lower surface (second side) of each of the sheets S stacked in the feeding cassette 601 both in duplex printing and in simplex printing in which the print surface priority mode is set to "on". The sheet S is then discharged to the discharge portion 605 with the lower surface (front side) on which the image of the front side has been formed facing downward (the same direction) both in duplex printing and in simplex printing in which the print surface priority mode is set to "on".

(Prohibition Operation in Sheet Attribute Setting)

Figure 14:
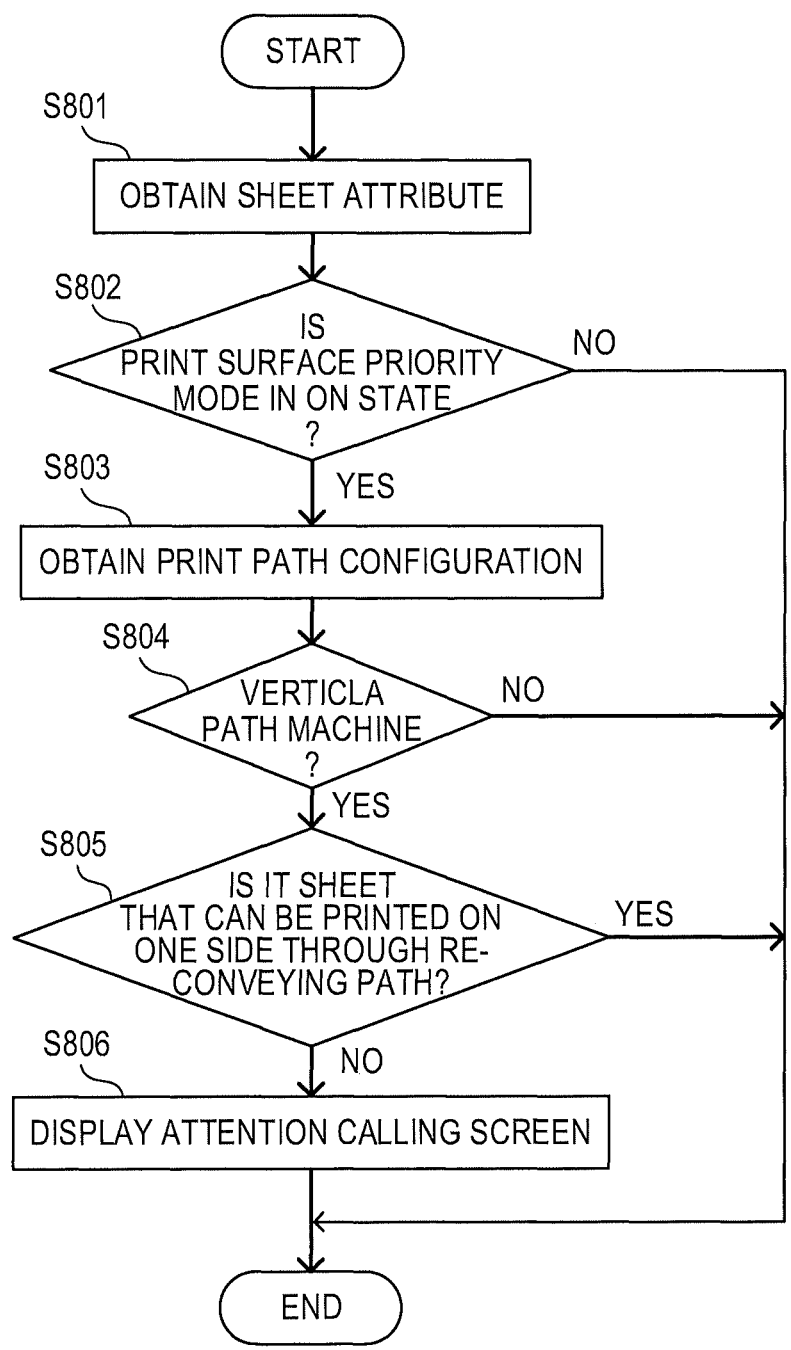
FIG. 14 is a flow chart for illustrating a prohibition operation that is executed by the CPU in sheet attribute setting.

FIG. 14 is a flow chart for illustrating prohibition operation that is executed by the CPU 201 in sheet attribute setting. In the third embodiment, the CPU 201 of the controller 101 prohibits the print surface priority mode from being set to "on" in sheet attributes that are associated with a sheet type unsuitable for simplex printing in which the sheet is passed along the re-conveying path 612. A program for the prohibition operation is stored on one of the ROM 210 and the disk 211. The CPU 201 reads the program out of one of the ROM 210 and the disk 211 onto the memory 202, and executes the prohibition operation.

When the prohibition operation is started, the CPU 201 obtains, in Step S801, the sheet attributes 502 set on the sheet attribute setting screen 501 (FIG. 4A). In Step S802, the CPU 201 determines whether the print surface priority mode is on from the sheet attributes obtained in Step S801. When the print surface priority mode is off ("NO" in Step S802), the CPU 201 ends the prohibition operation. When the print surface priority mode is on ("YES" in Step S802), on the other hand, the CPU 201 obtains a print path configuration in Step S803. In Step S804, the CPU 201 determines whether the print path configuration obtained in Step S803 is that of a vertical path machine. Specifically, the CPU 201 determines whether the print path configuration of a print path along which a sheet is conveyed is a vertical path configuration (conveying path) in which each of sheets stacked in a feeding unit is discharged with the sheet's upper surface facing different directions (upward and downward) in simplex printing and duplex printing. When the obtained print path configuration is not the print path configuration of a vertical path machine ("NO" in Step S804), the CPU 201 ends the prohibition operation. When the obtained print path configuration is the print path configuration of a vertical path machine ("YES" in Step S804), on the other hand, the CPU 201 determines, in Step S805, whether the sheet type indicates a sheet that can be passed along the re-conveying path 612 in simplex printing in the print surface priority mode. When the sheet type indicates a sheet that can be passed along the re-conveying path 612 in simplex printing ("YES" in Step S805), the CPU 201 ends the prohibition operation. When the sheet type indicates a sheet that cannot be passed along the re-conveying path 612 in simplex printing ("NO" in Step S805), on the other hand, the CPU 201 displays a screen for calling the user's attention on the liquid crystal display unit 401 in Step S806.

Figure 15A:
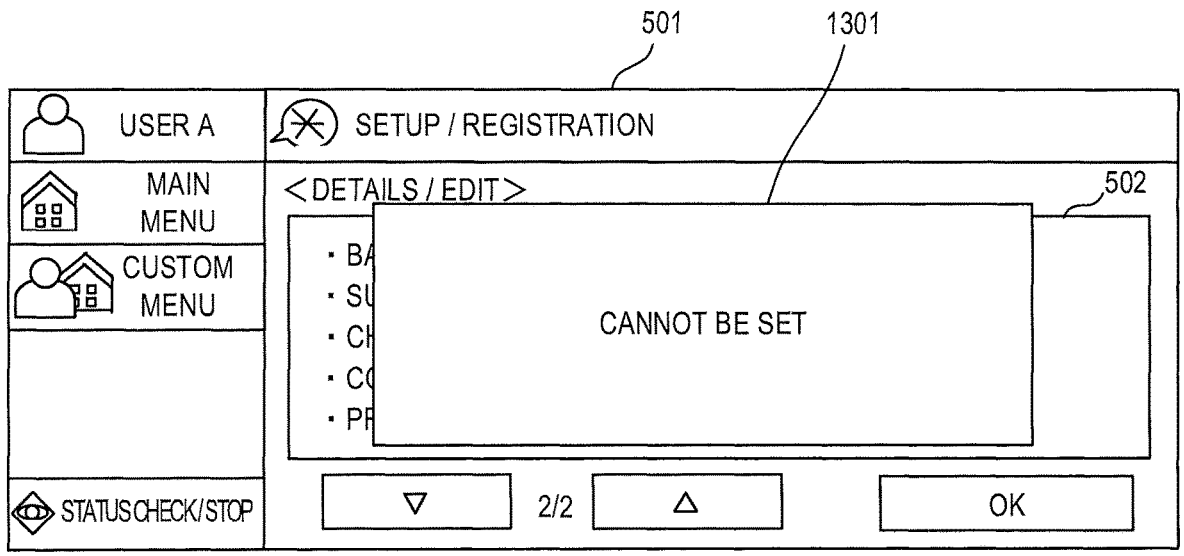
FIG. 15A and FIG. 15B are each a diagram for illustrating an example of a screen for calling a user's attention.
Figure 15B:
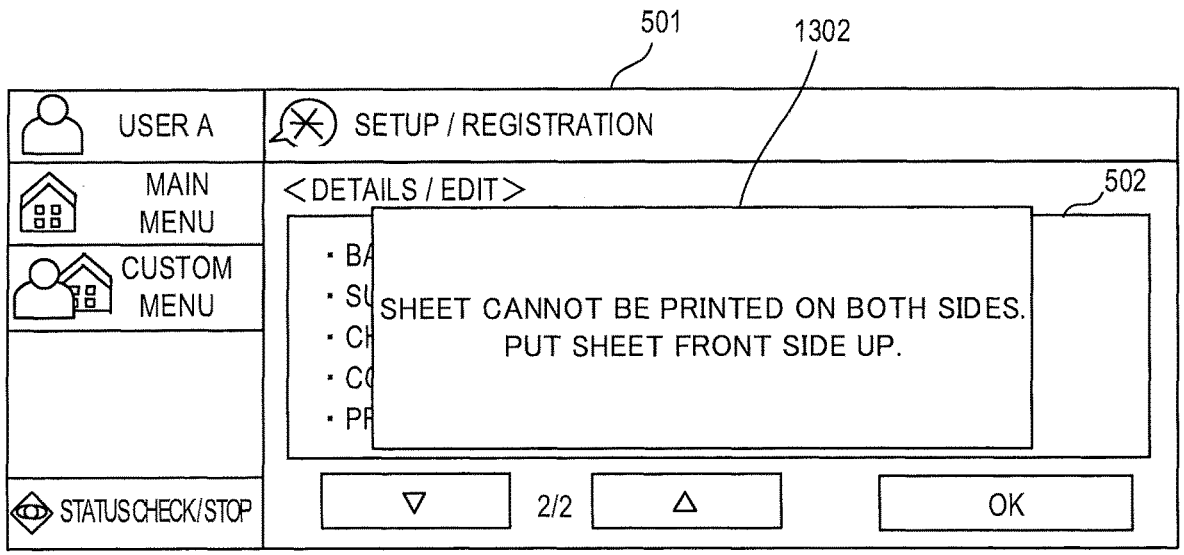

A sheet that cannot be passed along the re-conveying path 612 in simplex printing in the print surface priority mode is, for example, a used sheet. A used sheet is a sheet on which simplex printing has been performed and whose back side alone can be used as blank paper. When a used sheet is set in a feeding unit with the blank surface of the sheet facing upward, an image is unintentionally formed on the already printed surface of the used sheet reversed by passing through the re-conveying path 612 in the print surface priority mode. In order to prevent this, the MFP 100 calls the user's attention. FIG. 15A and FIG. 15B are each a diagram for illustrating an example of a screen for calling the user's attention. FIG. 15A is a diagram for illustrating a screen (alert screen) 1301 of a message "cannot be set" displayed overlaid on the sheet attributes 502 of the sheet attribute setting screen 501. FIG. 15B is a diagram for illustrating a screen (alert screen) 1302 of a message "Sheet cannot be printed on both sides. Put sheet front side up." displayed overlaid on the sheet attributes 502 of the sheet attribute setting screen 501. The CPU 201 ends the prohibition operation after a screen for calling the user's attention is displayed on the liquid crystal display unit 401.

As described above, according to the third embodiment, a screen for calling the user's attention can be displayed so that the print surface priority mode, in which a sheet is passed along the re-conveying path 612 to be subjected to simplex printing, is prevented from being set by mistake in the case of a sheet that cannot be passed along the re-conveying path 612 in simplex printing.

Fourth Embodiment

A fourth embodiment of the present invention is described below. In the fourth embodiment, a structure that is the same as the one in the third embodiment is denoted by the same reference symbol, and a description on the structure is omitted. The MFP 100, the control system 10, the console unit 106, the sheet attribute setting screen 501, sheet conveying paths, and prohibition operation in sheet attribute setting in the fourth embodiment are the same as those in the third embodiment, and descriptions thereof are accordingly omitted. In the third embodiment, the print surface priority mode is prohibited from being set to "on" in sheet attributes that are associated with a sheet type unsuitable for simplex printing in which the sheet is passed along the re-conveying path 612. In the fourth embodiments, sheet attributes in which the print surface priority mode is set to "on" are further prohibited from being set for a feeding unit from which a sheet cannot be conveyed to the re-conveying path 612. A feeding unit from which a sheet cannot be conveyed to the re-conveying path 612 is, for example, a feeding unit 121 of the inserter 120, which is placed between the printer unit 302 and finisher 104 of the MFP 100. The inserter 120 feeds a document, or a sheet on which an image has been formed (a printed sheet), to the finisher 104 without passing the sheet through the conveying path 611 and re-conveying path 612 of the printer unit 302, to insert a sheet one of before and after the sheet on which an image has been formed by the printer unit 302.

Figure 16A:
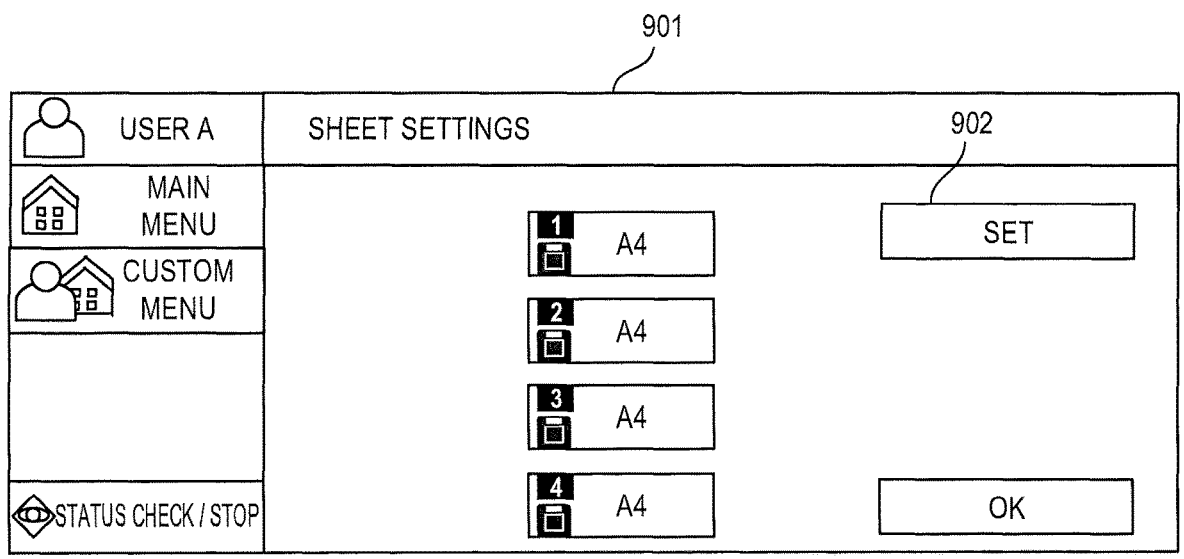
FIG. 16A is a diagram for illustrating a sheet setting screen.
Figure 16B:
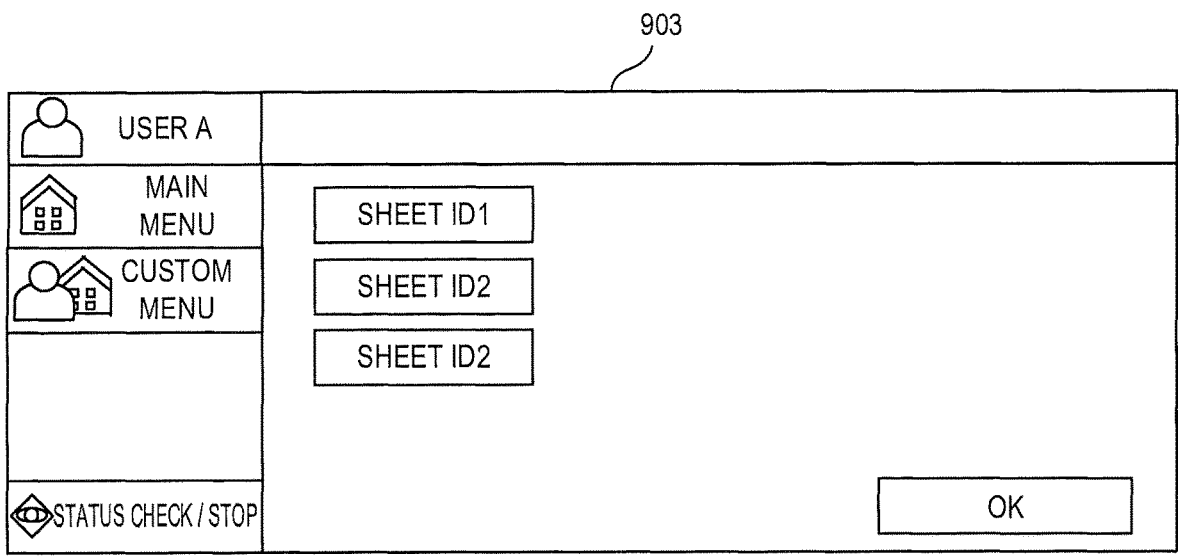
FIG. 16B is a diagram for illustrating a sheet ID setting screen.

An example of a sheet setting screen 901 and a sheet ID setting screen 903, which are displayed on the liquid crystal display unit 401 upon instruction from the CPU 201 of the controller 101, is described with reference to FIG. 16A and FIG. 16B. FIG. 16A and FIG. 16B are diagrams for illustrating the sheet setting screen 901 and the sheet ID setting screen 903, respectively. The settings of the first feeding unit 631 to the fourth feeding unit 634 are set on the sheet setting screen 901 illustrated in FIG. 16A. When the user selects a feeding unit and touches a set button 902, the sheet ID setting screen 903 illustrated in FIG. 16B is displayed on the liquid crystal display unit 401. The user is allowed to change the sheet ID of the feeding unit on the sheet ID setting screen 903.

(Prohibition Operation in Sheet ID Setting)

Figure 17:
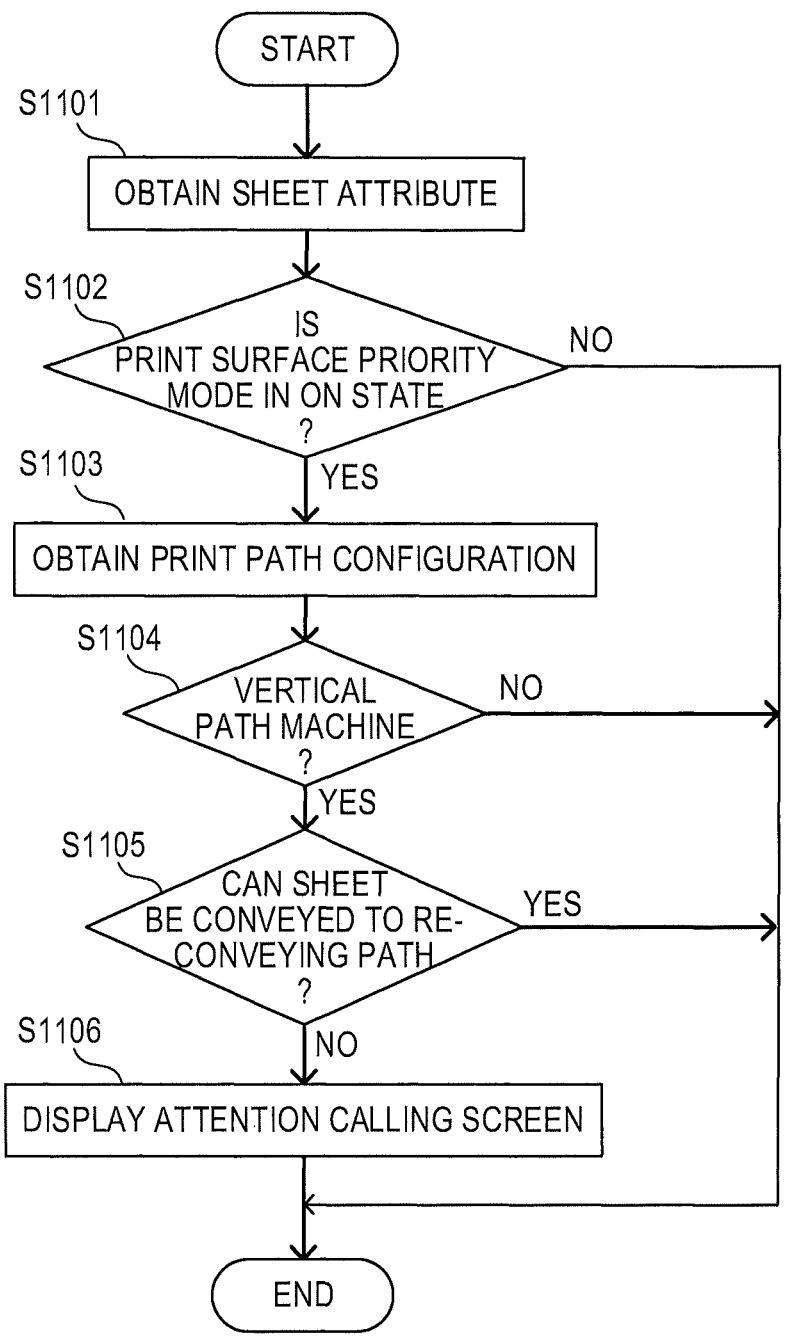
FIG. 17 is a flow chart for illustrating a prohibition operation that is executed by the CPU in sheet ID setting.

Prohibition operation in sheet ID setting in the second embodiment is described below. FIG. 17 is a flow chart for illustrating prohibition operation that is executed by the CPU 201 in sheet ID setting. In the fourth embodiment, the CPU 201 of the controller 101 prohibits sheet attributes in which the print surface priority mode is set to "on" from being set for a feeding unit unsuitable for duplex printing. A program for the prohibition operation is stored on one of the ROM 210 and the disk 211. The CPU 201 reads the program out of one of the ROM 210 and the disk 211 onto the memory 202, and executes the prohibition operation.

When the prohibition operation is started, the CPU 201 obtains, in Step S1101, the sheet attributes 502 that are associated with the sheet ID set on the sheet ID setting screen 903 (FIG. 16B). In Step S1102, the CPU 201 determines whether the print surface priority mode is on from the sheet attributes obtained in Step S1101. When the print surface priority mode is off ("NO" in Step S1102), the CPU 201 ends the prohibition operation. When the print surface priority mode is on ("YES" in Step S1102), on the other hand, the CPU 201 obtains a print path configuration in Step S1103. In Step S1104, the CPU 201 determines whether the print path configuration obtained in Step S1103 is that of a vertical path machine. Specifically, the CPU 201 determines whether the print path configuration of a print path along which a sheet is conveyed is a vertical path configuration (conveying path) in which each of sheets stacked in a feeding unit is discharged with the sheet's upper surface facing different directions (upward and downward) in simplex printing and duplex printing. When the obtained print path configuration is not the print path configuration of a vertical path machine ("NO" in Step S1104), the CPU 201 ends the prohibition operation.

Figure 18A:
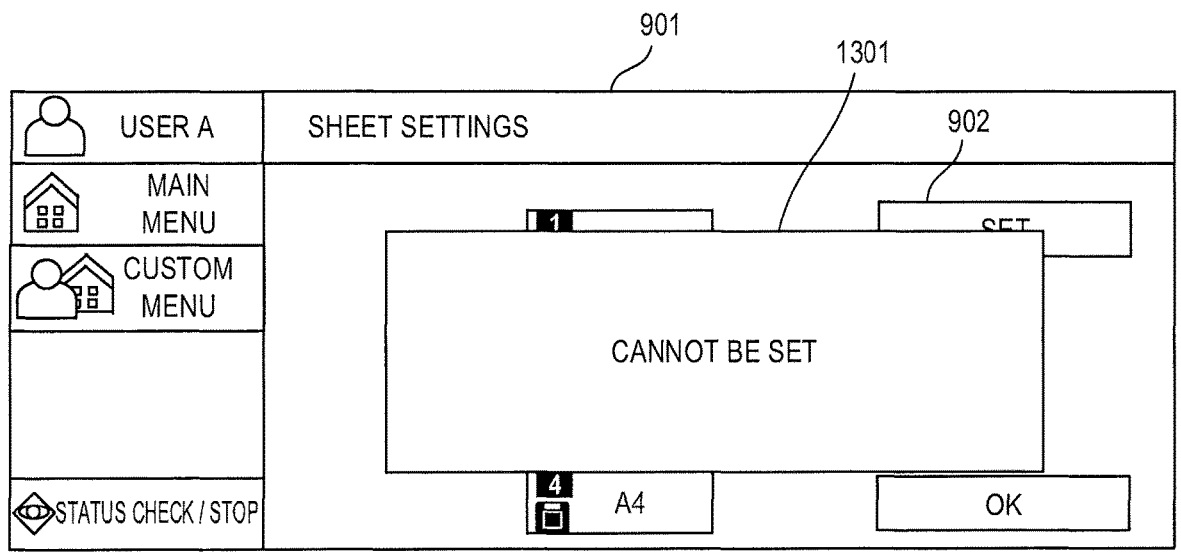
FIG. 18A and FIG. 18B are each a diagram for illustrating an example of a screen for calling a user's attention.
Figure 18B:
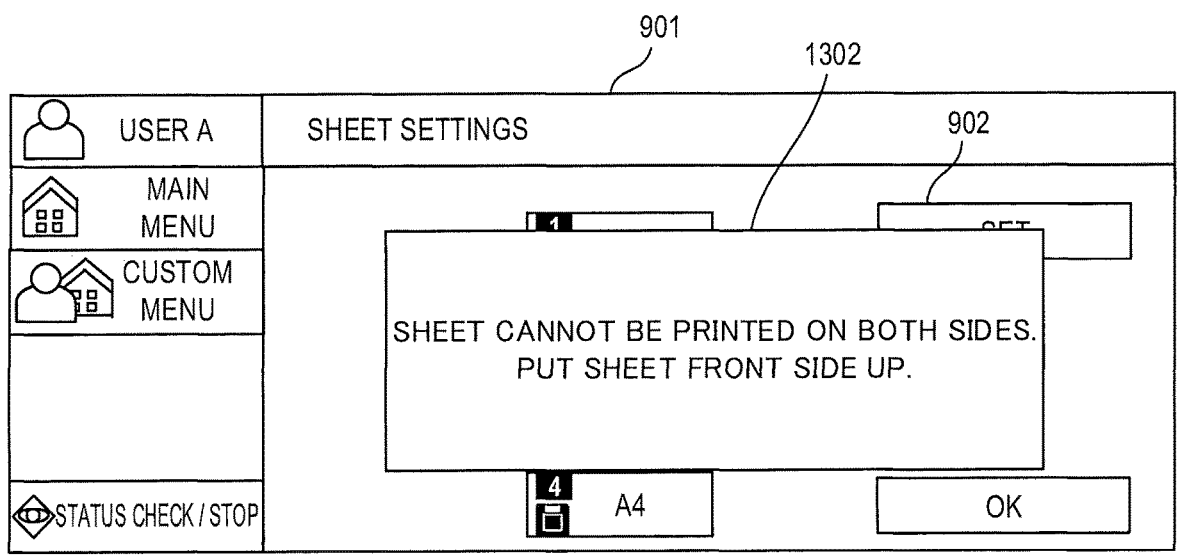

When the obtained print path configuration is the print path configuration of a vertical path machine ("YES" in Step S1104), on the other hand, the CPU 201 determines, in Step S1105, whether a sheet can be conveyed to the re-conveying path 612 from a feeding unit to which the sheet ID is set. When a sheet can be conveyed to the re-conveying path 612 from the feeding unit ("YES" in Step S1105), the CPU 201 ends the prohibition operation. When a sheet cannot be conveyed to the re-conveying path 612 ("NO" in Step S1105), on the other hand, the CPU 201 displays a screen for calling the user's attention on the liquid crystal display unit 401 in Step S1106. FIG. 18A and FIG. 18B are each a diagram for illustrating an example of a screen for calling the user's attention. FIG. 18A is a diagram for illustrating a screen (alert screen) 1301 of a message "cannot be set" displayed overlaid on the sheet setting screen 901. FIG. 18B is a diagram for illustrating a screen (alert screen) 1302 of a message "Sheet cannot be printed on both sides. Put sheet front side up." displayed overlaid on the sheet setting screen 901. The CPU 201 ends the prohibition operation after a screen for calling the user's attention is displayed on the liquid crystal display unit 401. The screen 1302 illustrated in FIG. 18B is not displayed for a feeding unit that feeds a sheet to be inserted one of before and after a sheet discharged from the printer unit 302, for example, the feeding unit of the inserter 120.

As described above, according to the fourth embodiment, a screen for calling the user's attention can be displayed so that a sheet ID for which the print surface priority mode is set to "on" is prevented from being set by mistake for a feeding unit from which a sheet cannot be conveyed to the re-conveying path 612.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-047732, filed Mar. 15, 2018, Japanese Patent Application No. 2018-047733, filed Mar. 15, 2018, and Japanese Patent Application No. 2018-233608, filed Dec. 13, 2018, which are hereby incorporated by reference herein in their entirety.

What is claimed is:

1. An image forming apparatus, comprising:
a feeding unit on which a sheet is to be stacked;
a conveying path on which the sheet fed from the feeding unit is to be conveyed;
an image forming portion configured to form an image on the sheet conveyed on the conveying path;
a reverse portion configured to reverse the sheet passed through the image forming portion;
a re-conveying path on which the sheet reversed by the reverse portion is to be conveyed;
a discharge portion to which the sheet on which the image has been formed is to be discharged;
a storage portion configured to store attribute information associated with a sheet type; and
a controller configured to receive a print job, which includes the sheet type and print settings of simplex printing or duplex printing,
wherein, when the duplex printing is set in the print settings, the controller controls the image forming portion to form an image on a first side of the sheet conveyed from the feeding unit to the conveying path, controls the reverse portion to reverse the sheet on which the image has been formed, controls the image forming portion to form an image on a second side opposite to the first side of the sheet conveyed to the conveying path through the re-conveying path, and then discharges the sheet to the discharge portion,
wherein, when the simplex printing is set in the print settings, the controller determines whether a mode set in the attribute information associated with the sheet type that is included in the print job is a first mode or a second mode,
wherein, when the mode is the first mode, the controller controls the image forming portion to form an image on the first side of the sheet conveyed from the feeding unit to the conveying path, and discharges the sheet on which the image has been formed to the discharge portion without passing the sheet through the re-conveying path, and
wherein, when the mode is the second mode, the controller controls the image forming portion to avoid forming an image on the first side of the sheet conveyed from the feeding unit to the conveying path, controls the reverse portion to reverse the sheet, controls the image forming portion to form an image on the second side opposite to the first side of the sheet conveyed to the conveying path through the re-conveying path, and discharges the sheet to the discharge portion,
wherein the sheet stacked on the feeding unit is discharged to the discharge portion with an upper surface of the sheet facing different directions in the duplex printing and in the simplex printing in which the first mode is set, and
wherein the sheet stacked on the feeding unit is discharged to the discharge portion with the upper surface of the sheet facing the same direction in the duplex printing and in the simplex printing in which the second mode is set.

2. The image forming apparatus according to claim 1, wherein, when the duplex printing is set in the print settings, the controller forms the image of a back side on the first side and the image of a front side on the second side.

3. The image forming apparatus according to claim 1, wherein, when the simplex printing is set in the print settings and the mode is the second mode, the controller sets image data of a blank surface as image data of the first side and forms the image of a front side on the second side.

4. The image forming apparatus according to claim 1, wherein the feeding unit includes a plurality of feeding units,
wherein the storage portion stores an association relationship between each of the plurality of feeding units and the sheet type,
wherein the print job includes a feeding unit designation in which whether the sheet is designated by the feeding unit is set and a sheet type designation in which whether the sheet is designated by the sheet type is set, and
wherein, when it is set to designate the sheet by the sheet type in the print job, the controller selects a feeding unit from among the plurality of feeding units according to the sheet type.

5. The image forming apparatus according to claim 4, wherein, when it is set not to designate the sheet by the feeding unit in the print job and it is set not to designate the sheet by the sheet type in the print job, the controller avoids selecting a feeding unit that is associated with the sheet type for which the second mode is set in the attribute information associated with the sheet type.

6. An image forming apparatus, comprising:
a feeding unit on which a sheet is to be stacked;
a conveying path on which the sheet fed from the feeding unit is to be conveyed;
an image forming portion configured to form an image on the sheet conveyed on the conveying path;
a reverse portion configured to reverse the sheet passed through the image forming portion;
a re-conveying path on which the sheet reversed by the reverse portion is to be conveyed;
a discharge portion to which the sheet on which the image has been formed is to be discharged;
a controller configured to receive a print job, which includes a sheet type and print settings of simplex printing or duplex printing; and
a console unit through which a user sets a first mode or a second mode in attribute information associated with the sheet type,
wherein, when the duplex printing is set in the print settings, the controller controls the image forming portion to form an image on a first side of the sheet conveyed from the feeding unit to the conveying path, controls the reverse portion to reverse the sheet on which the image has been formed, controls the image forming portion to form an image on a second side opposite to the first side of the sheet conveyed to the conveying path through the re-conveying path, and then discharges the sheet to the discharge portion,
wherein, when the simplex printing is set in the print settings and the first mode is set in the attribute information, the controller controls the image forming portion to form an image on the first side of the sheet conveyed from the feeding unit to the conveying path, and discharges the sheet on which the image has been formed to the discharge portion without passing the sheet through the re-conveying path, wherein, when the simplex printing is set in the print settings and the second mode is set in the attribute information, the controller controls the image forming portion to avoid forming an image on the first side of the sheet conveyed from the feeding unit to the conveying path, controls the reverse portion to reverse the sheet, controls the image forming portion to form an image on the second side opposite to the first side of the sheet conveyed to the conveying path through the re-conveying path, and discharges the sheet to the discharge portion, and wherein, when the sheet type indicates a sheet unsuitable for printing in the second mode and the second mode is set in the attribute information through the console unit, the controller controls the console unit to display a screen for calling the user's attention, wherein the sheet stacked on the feeding unit is discharged to the discharge portion with an upper surface of the sheet facing different directions in the duplex printing and in the simplex printing in which the first mode is set, and wherein the sheet stacked on the feeding unit is discharged to the discharge portion with the upper surface of the sheet facing the same direction in the duplex printing and in the simplex printing in which the second mode is set.

7. The image forming apparatus according to claim 6, wherein the sheet unsuitable for printing in the second mode includes a used sheet having a front side that has been printed by simplex printing and having a back side that is usable as a blank surface and faces upward.

8. An image forming apparatus, comprising:

a plurality of feeding units on each of which a sheet is to be stacked;

a conveying path on which the sheet fed from the plurality of feeding units is to be conveyed;

an image forming portion configured to form an image on the sheet conveyed on the conveying path;

a reverse portion configured to reverse the sheet passed through the image forming portion;

a re-conveying path on which the sheet reversed by the reverse portion is to be conveyed;

a discharge portion to which the sheet on which the image has been formed is to be discharged;

a controller configured to receive a print job, which includes a sheet type and print settings of simplex printing or duplex printing; and a console unit through which a user sets a first mode or a second mode in attribute information associated with the sheet type so that the sheet type is set to each of the plurality of feeding units, wherein, when the duplex printing is set in the print settings, the controller controls the image forming portion to form an image on a first side of the sheet conveyed from the feeding unit to the conveying path, controls the reverse portion to reverse the sheet on which the image has been formed, controls the image forming portion to form an image on a second side opposite to the first side of the sheet conveyed to the conveying path through the re-conveying path, and then discharges the sheet to the discharge portion, wherein, when the simplex printing is set in the print settings and the first mode is set in the attribute information, the controller controls the image forming portion to form an image on the first side of the sheet conveyed from the feeding unit to the conveying path, and discharges the sheet on which the image has been formed to the discharge portion without passing the sheet through the re-conveying path, wherein, when the simplex printing is set in the print settings and the second mode is set in the attribute information, the controller controls the image forming portion to avoid forming an image on the first side of the sheet conveyed from the feeding unit to the conveying path, controls the reverse portion to reverse the sheet, controls the image forming portion to form an image on the second side opposite to the first side of the sheet conveyed to the conveying path through the re-conveying path, and discharges the sheet to the discharge portion, and wherein, when the second mode is set in the attribute information associated with the sheet type and a feeding unit of the plurality of feeding units to which the sheet type is set through the console unit is unable to convey the sheet to the conveying path, the controller controls the console unit to display a screen for calling the user's attention, wherein the sheet stacked on each feeding unit is discharged to the discharge portion with an upper surface of the sheet facing different directions in the duplex printing and in the simplex printing in which the first mode is set, and wherein the sheet stacked on each feeding unit is discharged to the discharge portion with the upper surface of the sheet facing the same direction in the duplex printing and in the simplex printing in which the second mode is set.

9. The image forming apparatus according to claim 8, wherein the feeding unit unable to convey the sheet to the conveying path comprises an inserter configured to insert a sheet before or after the sheet on which the image has been formed by the image forming portion.

* * * * *